(12) United States Patent
Koo et al.

(10) Patent No.: US 12,244,686 B2
(45) Date of Patent: Mar. 4, 2025

(54) IMAGE SENSOR, IMAGE PROCESSING SYSTEM HAVING THE SAME AND OPERATING METHOD OF THE SAME

(71) Applicant: SAMSUNG ELECTRONICS CO., LTD., Suwon-si (KR)

(72) Inventors: Sigyoung Koo, Hwaseong-si (KR); Buyong Um, Seongnam-si (KR); Serin Kim, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 274 days.

(21) Appl. No.: 17/883,917

(22) Filed: Aug. 9, 2022

(65) Prior Publication Data

US 2023/0163943 A1 May 25, 2023

(30) Foreign Application Priority Data

Nov. 23, 2021 (KR) .......................... 10-2021-0162168
Dec. 1, 2021 (KR) .......................... 10-2021-0170104
(Continued)

(51) Int. Cl.
*G06F 21/75* (2013.01)
*G06F 21/64* (2013.01)
(Continued)

(52) U.S. Cl.
CPC .............. *H04L 9/003* (2013.01); *G06F 21/64* (2013.01); *H04L 9/0618* (2013.01);
(Continued)

(58) Field of Classification Search
CPC ..... H04L 9/003; H04L 9/0618; H04L 9/0825; H04L 9/0869; H04L 9/32; H04N 23/665;
(Continued)

(56) References Cited

U.S. PATENT DOCUMENTS 7,680,273 B2   3/2010  Whitehead et al.
8,422,671 B2   4/2013  Yoon et al.
(Continued)

FOREIGN PATENT DOCUMENTS

CN   106603496 A   4/2017
CN   111865584 A   10/2020
(Continued)

OTHER PUBLICATIONS

Kinga Marton et al., "Randomness in Digital Cryptography: A Survey", Romanian Journal of Information Science and Technology, vol. 13, No. 3, 2010, pp. 219-240, XP055289898.
(Continued)

*Primary Examiner* — Malcolm Cribbs
(74) *Attorney, Agent, or Firm* — Sughrue Mion, PLLC

(57) ABSTRACT

An image sensor includes a non-volatile memory (NVM) storing a encoded private key and partial information of a private key, using first random numbers generated by repeating a first random number generation operation using the partial information of the private key, and a security circuit that performs a decryption operation on a cipher text received from a controller. The security circuit includes a self-recursive decoder that receives the encoded private key from the NVM during the decryption operation, repeats a second random number generation operation using the partial information of the private key to generate second random numbers, and uses the second random numbers to restore the encoded private key to the private key, and a crypto module that uses the restored private key to decrypt the cipher text.

19 Claims, 32 Drawing Sheets

(30) Foreign Application Priority Data

May 2, 2022 (KR) ........................ 10-2022-0054062
May 2, 2022 (KR) ........................ 10-2022-0054063

(51) Int. Cl.

| | |
|---|---|
| *H04L 9/00* | (2022.01) |
| *H04L 9/06* | (2006.01) |
| *H04L 9/08* | (2006.01) |
| *H04L 9/32* | (2006.01) |
| *H04N 7/025* | (2006.01) |
| *H04N 23/60* | (2023.01) |

(52) U.S. Cl.
CPC .......... *H04L 9/0825* (2013.01); *H04L 9/0869* (2013.01); *H04L 9/32* (2013.01); *H04N 7/025* (2013.01); *H04N 23/665* (2023.01)

(58) Field of Classification Search
CPC ......... H04N 7/025; G06F 21/64; G06F 21/75; G06F 21/755
See application file for complete search history.

(56) References Cited

U.S. PATENT DOCUMENTS

| | | | |
|---|---|---|---|
| 8,707,052 | B2 | 4/2014 | Kocher et al. |
| 9,094,191 | B2 | 7/2015 | Avanzi et al. |
| 9,710,617 | B2 | 7/2017 | Oxford |
| 2003/0048903 | A1 | 3/2003 | Ito et al. |
| 2006/0159258 | A1 | 7/2006 | Rottschafer et al. |
| 2013/0329887 | A1* | 12/2013 | Lee .................. G09C 1/00 380/268 |
| 2014/0301550 | A1* | 10/2014 | Lewis .................. H04L 9/0822 380/259 |
| 2019/0097805 | A1 | 3/2019 | Shin et al. |
| 2019/0253439 | A1 | 8/2019 | Payton |
| 2020/0244442 | A1 | 7/2020 | Zeh et al. |
| 2022/0021660 | A1* | 1/2022 | Trieflinger .......... H04L 63/0414 |

FOREIGN PATENT DOCUMENTS

| | | |
|---|---|---|
| JP | 4768327 B2 | 9/2011 |
| KR | 10-1725847 B1 | 4/2017 |

OTHER PUBLICATIONS

Antonio J. Acosta et al., "Embedded electronic circuits for cryptography, hardware security and true random No. generation: an overview", International Journal of Circuit Theory and Applications, vol. 45, Issue 2, Dec. 13, 2016, pp. 145-169, DOI: 10.1002/cta.2296, XP071448448.

Mottaqiallah Taouil et al., "Power Side Channel Attacks: Where Are We Standing?", 2021 16th International Conference on Design & Technology of Integrated Systems in Nanoscale Era (DTIS), IEEE, 2021, 6 pages, DOI: 10.1109/DTIS53253.2021.9505075, XP033957448.

Elaine Barker et al., "Recommendation for Random Bit Generator (RBG) Constructions", Draft NIST Special Publication 800-90C, NIST Computer Security Division, Aug. 2012, 50 pages, XP055803705.

Communication issued on May 2, 2023 by the European Patent Office for European Patent Application No. 22200925.0.

* cited by examiner

IMAGE SENSOR, IMAGE PROCESSING SYSTEM HAVING THE SAME AND OPERATING METHOD OF THE SAME

CROSS-REFERENCE TO RELATED APPLICATION(S)

This application is based on and claims priority from Korean Patent Application Nos. 10-2021-0162168, 10-2021-0170104, 10-2022-0054062, and 10-2022-0054063, filed on Nov. 23, 2021, Dec. 1, 2021, May 2, 2022, and May 2, 2022, respectively, in the Korean Intellectual Property Office, the disclosures of which are incorporated by reference herein in their entirety.

BACKGROUND

The present disclosure relates to an image sensor, an image processing system having the same, and an operating method of the same.

Autonomous driving is emerging as a key technology in the future automobile industry, allowing a vehicle to operate on its own without the intervention of a driver or passengers. As a basic technology that enables autonomous driving, it is necessary to first implement technologies such as lane detection using LIDAR, a CMOS image sensor (CIS), or the like, recognition of front/side/rear vehicles to determine a distance between vehicles, pedestrian recognition, road environment recognition, or the like. To this end, a vehicle senses current road conditions and driving conditions using a sensor in the vehicle, and then transmits relevant information to a main controller in the vehicle. However, in a case in which a third-party hacks a vehicle and sends incorrect information to the main controller of the vehicle, the main controller may make an incorrect decision due to inflow of incorrect information. This hacking situation may be an important issue related to the safety of passengers as it is directly linked to a vehicle traveling at high speed in real time. For example, with respect to a situation in which a lane on a road on which the vehicle travels is a straight-traveling lane, as determined through an image captured by a camera sensor, and the sensor sends information of the image to the main controller of the vehicle, when a hacker, i.e., a third-party, intervenes between the sensor and the main controller to manipulate the image, and sends a manipulated image to the controller depicting the lane on the road as a right-turning lane, the main controller may control the vehicle to turn right, causing a serious accident, based on incorrect lane information, even though the vehicle is travelling in a straight-traveling lane. For this reason, there is a need for a technology to determine whether a third party is intervening between the sensor and the controller, that is, a technology that guarantees integrity of information from the sensor.

SUMMARY

It is an aspect to provide an image sensor for preventing a differential power analysis (DPA) attack, an image processing system having the same, and an operating method of the same.

It is another aspect to provide an image sensor having a reduced area, an image processing system having the same, and an operating method of the same.

It is yet another aspect to provide an image sensor for preventing a differential power analysis (DPA) attack against a private key, an image processing system having the same, and an operating method of the same.

It is yet another aspect to provide a system and method for protecting a private key stored in a non-volatile memory (NVM) on a cybersecurity processing system in a CMOS image sensor (CIS), from a differential power analysis (DPA) attack.

According to an aspect of one or more embodiments, an image sensor includes an image sensing circuit that acquires image data; and a security circuit that generates a tag for integrity of the image data, wherein the security circuit includes a crypto module that receives a cipher text encrypted with a public key from a controller, and uses a private key to decrypt the cipher text based on an encryption algorithm; and a differential power analysis (DPA) countermeasure module that uses a random value corresponding to all or a portion of the cipher text to perform DPA defense against an operation of the crypto module.

According to another aspect of one or more embodiments, an operating method of an image sensor includes receiving a cipher text with a controller; generating a random number using the cipher text; and executing a differential power analysis (DPA) countermeasure module using the random number.

According to yet another aspect of one or more embodiments, an image processing system includes an image sensor that acquires image data; and a controller that receives the image data from the image sensor, wherein the image sensor includes an image sensing circuit that senses the image data; and a security circuit that performs an authentication operation with the controller, receives a cipher text from the controller, and uses a secret key to decrypt the received cipher text, wherein the security circuit uses all or a portion of the cipher text to generate a random number, and uses the random number to prevent a differential power analysis (DPA) attack on the secret key in a decryption operation of the cipher text.

According to yet another aspect of one or more embodiments, an image sensor includes a non-volatile memory (NVM) that stores a encoded private key and partial information of a private key, using first random numbers generated by repeating a first random number generation operation using the partial information of the private key; and a security circuit that performs a decryption operation on a cipher text received from a controller, wherein the security circuit includes a self-recursive decoder that receives the encoded private key from the NVM during the decryption operation, repeats a second random number generation operation using the partial information of the private key to generate second random numbers, and uses the second random numbers to restore the encoded private key to the private key; and a crypto module that uses the restored private key to decrypt the cipher text.

According to yet another aspect of one or more embodiments, an image sensor includes an image sensing circuit that acquires an image signal; a signal processor that processes the acquired image signal to output image data; a security circuit that receives the image data and generates a tag corresponding to the image data; a non-volatile memory (NVM) that stores an encoded private key and a public key; and an interface circuit that outputs the image data and the tag to an external device, wherein the security circuit includes a crypto module that reads the encoded private key from the NVM at boot time, restores the encoded private key according to a predetermined mode, decrypts an encrypted session key using the restored private key to acquire a session key, and generates the tag corresponding to the image data using the session key; and a differential power analysis (DPA) countermeasure module that uses a random number to prevent a DPA attack, when the restored private key or the session key is used in the crypto module.

BRIEF DESCRIPTION OF DRAWINGS

The above and other aspects will be more clearly understood from the following detailed description, taken in conjunction with the accompanying drawings, in which.

DETAILED DESCRIPTION

Hereinafter, example embodiments will be described clearly and in detail to the extent that a person of ordinary skill in the art may easily implement the same using the drawings.

An image sensor, an image processing system having the same, and an operating method of the same, according to some embodiments, may include a differential power analysis (DPA) countermeasure module using a private key stored in a non-volatile memory (NVM) of a CMOS image sensor (CIS), to prevent or incapacitate a DPA attack against the private key (or a secret key). In addition, an image sensor, an image processing system having the same, and an operating method of the same, according to some embodiments, may store a encoded private key in a non-volatile memory (e.g., NVM), may load the encoded private key from the non-volatile memory during a decryption operation, and may restore a private key from the encoded private key, to fundamentally block a DPA attack at the time of loading the private key. Therefore, an image sensor, an image processing system having the same, and an operating method of the same, according to some embodiments, may eliminate the possibility of leakage of a private key due to a DPA attack and may improve reliability of a cyber security system.

Figure 1:
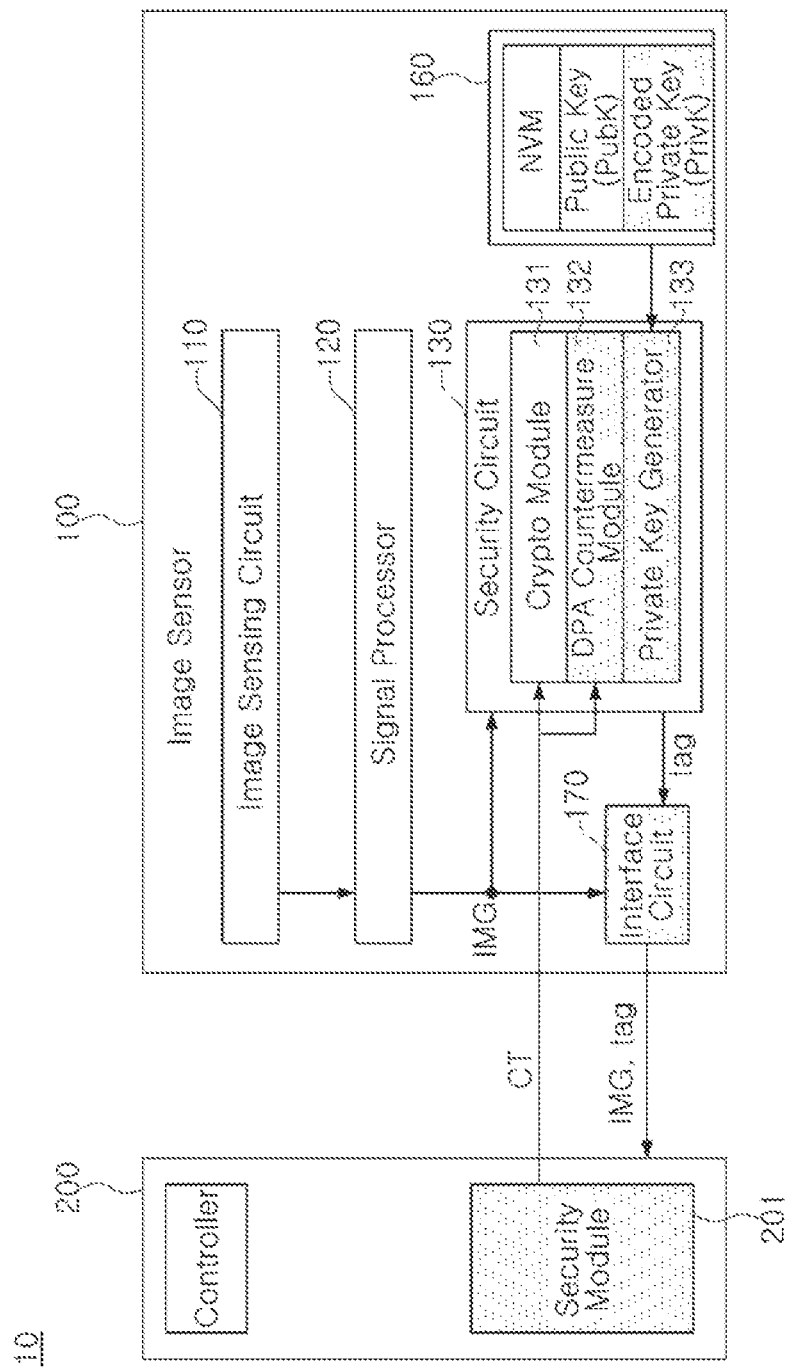
FIG. 1 is a view illustrating an image processing system according to some embodiments.

FIG. 1 is a view illustrating an image processing system 10 according to some embodiments. Referring to FIG. 1, an image processing system 10 may include an image sensor 100 and a controller 200. In some embodiments, the image sensor 100 may be, for example, a CMOS image sensor (CIS). In some embodiments, the controller 200 may be an electronic control unit (ECU). For example, the image sensor 100 may be a camera device that performs an imaging operation using a camera lens. The image processing system 10 may be applied to various types of systems. For example, the image processing system 10 may be applied to an autonomous driving system.

Although a device for controlling the image sensor 100 is illustrated in FIG. 1 as the controller 200, with an example of the electronic control unit (ECU), it should be understood that the controller of various embodiments is not limited thereto. In addition to an ECU, the controller 200 of some embodiments may be an image signal processor (ISP), an application processor (AP), and/or a host.

The image sensor 100 may be implemented to acquire an image from around a vehicle. The image sensor 100 may be implemented to convert the acquired image into a security image guaranteeing reliability and to transmit the converted security image to the controller 200. In an embodiment, the security image may include original image data IMG and a tag for verifying reliability of the original image data IMG. In some embodiments, the tag may be a cipher-based message authentication code (CMAC). In another embodiment, the security image may include an image encrypted based on an encryption algorithm.

The image sensor 100 may include an image sensing circuit 110, a signal processor 120, a security circuit 130, an NVM 160, and an interface circuit 170 (MIPI). In an embodiment, the image sensor 100 may be implemented as a vehicle image sensor, for example, ISOCELL Auto 4AC.

The image sensing circuit 110 may be implemented to obtain an image using a plurality of pixels. The image sensing circuit 110 may include a pixel array implemented as one of an N-type metal-oxide-semiconductor (NMOS)

image sensor, a complementary metal-oxide-semiconductor (CMOS) image sensor, or a charge coupled device (CCD) image sensor.

The signal processor 120 may be implemented to output the image data IMG by processing an image signal that is acquired from the image sensing circuit 110 according to at least one processing method.

The security circuit 130 may be implemented to perform a series of security functions (e.g., an authentication operation, a key exchange operation, an encryption/decryption operation, etc.) to convert the acquired image data IMG into a security image. In this case, the security circuit 130 may be implemented in software, hardware, and/or firmware. For example, the security circuit 130 may include one or more microprocessors that execute the security functions described herein or control logic configured to implement the security functions described herein.

The security circuit 130 may be implemented to perform an authentication operation with the controller 200. In this case, the authentication operation may be performed based on various algorithms. In an embodiment, an authentication procedure may be performed based on an asymmetric-key algorithm such as Rivest Shamir Adleman (RSA), elliptic curve cryptography (ECC), Diffie-Hellman, or the like. In another embodiment, the authentication procedure may be performed based on a symmetric-key algorithm such as advanced encryption standard (AES), data encryption standard (DES), or the like. In an embodiment, the authentication operation may be initiated after an operation of setting up the image sensor 100. While the authentication operation is performed, the image data IMG and the tag, acquired from the image sensor 100, may be transmitted separately to the controller 200. In other words, the image transmitted simultaneously with the authentication operation may not include the tag for reliability verification. By contrast, once the authentication operation has been completed, the image data IMG and the tag may be transmitted simultaneously to the controller 200.

The security circuit 130 may be implemented to perform a security processing operation on the image data IMG to identify whether the image transmitted from the controller 200 has been forged or tampered with. In this case, the security processing operation may generate the tag for the acquired image data IMG.

In an embodiment, the security circuit 130 may generate the tag using the image data IMG and key information (e.g., shared key information). In this case, the tag may be, for example, a message authentication code (MAC) for all or a portion of the image data IMG. In some embodiments, the MAC may be, for example, a cipher-based message authentication code (CMAC)).

The security circuit 130 may include a crypto module 131, a DPA countermeasure module 132, and a private key generator 133. The crypto module 131 may be implemented to perform an encryption operation or a decryption operation, based on an encryption algorithm. For example, in some embodiments, the crypto module 131 may be executed by the one or more microprocessors of the security circuit 130 to perform the operations of the module described herein, or may be implemented as a crypto circuit or logic that is part of the security circuit 130. In an embodiment, the crypto module 131 may receive a cipher text CT from the controller 200, and may decrypt the cipher text CT using a private key PrivK of the image sensor 100 and an encryption algorithm (a public key-based algorithm, for example, an RSA encryption algorithm). In this case, the cipher text CT may be encrypted in the controller 200 by a public key PubK of the image sensor 100 and the encryption algorithm.

The DPA countermeasure module 132 may be implemented to prevent a DPA attack against the image sensor 100. For example, in some embodiments, the DPA countermeasure module 132 may be executed by the one or more microprocessors of the security circuit 130 to perform the operations of the module described herein, or may be implemented as a DPA countermeasure circuit or logic that is part of the security circuit 130. 0. In general, a DPA attack may acquire a private key (e.g., a secret key) by analyzing power consumption when an encryption algorithm is executed. A countermeasure on the DPA attack may have a method of modifying an encryption algorithm itself using a random number, and a method of eliminating correlation between information of power consumption to be leaked and an intermediate value, during an encryption operation, using a dual-rail logic. In this case, the dual-rail logic method may insert a random time or use a random clock. All of these countermeasures may require a random number. The DPA countermeasure module 132 may defend against a differential power attack using a random number.

In an embodiment, the random number may be generated from a true random number generator. In another embodiment, the random number may be generated from a pseudo-random number generator. For example, the random number may be generated using the cipher text CT transmitted from the controller 200 to generate a random number required for a DPA defense operation. In this case, the cipher text CT may have the randomness (or entropy) of an encryption algorithm used. This randomness may be because, for example, in an RSA encryption algorithm, the cipher text CT may be generated using a random padding technique.

In general, an RSA encryption algorithm requires two keys. One key may be a public key, and the other key may be a private key. A message (m) may be encrypted using the public key, and a cipher text may be decrypted using the private key. Generation of the keys through the RSA encryption algorithm may be as follows. First, two large prime numbers p and q may be randomly chosen. In this case, a value of n may be determined by n=pq. Also, $\phi(n)=(p-1)(q-1)$, which is the number of numbers that may be less than or equal to n and may be prime to n, may be calculated. Here, $1<e<\phi(n)$, and e may be chosen such that e and $\phi(n)$ are coprime. Thereafter, d in which de≡1(mod $\phi(n)$) is satisfied may be calculated. That is, for any integer k, de=1+k$\phi(n)$ will be satisfied. In this case, (n, e) may be the public key and d may be the private key. In this case, a sender may transmit $c=m^e$ mod n to a receiver. The receiver may receive c from the sender, and may execute decryption using a private key (d) from c, to calculate $m=c^d$ mod n. This may be because it is $m^{ed} \equiv 0^{ed} \equiv 0 \equiv m$ (mod p). An RSA encryption algorithm uses a principle that it is easy to make a composite number using a prime number, but it is difficult to make a prime number by factoring a composite number into a prime number. In this case, the RSA encryption algorithm may basically have randomness. Therefore, messages (m), which are identical, may be output as cipher text having different values, when the messages are encrypted using an encryption algorithm.

In summary, the DPA countermeasure module 132 may be implemented to reduce direct exposure of the private key using a random number, when a security processing operation (an authentication operation, a decryption operation, a key generation operation, a MAC operation, etc.) is performed.

The private key generator 133 may be implemented to read an encoded private key from the NVM 160, and to restore a private key of the image sensor 100. For example, in some embodiments, the private key generator 133 may be executed by the one or more microprocessors of the security circuit 130 to perform the operations of the generator described herein, or may be implemented as a private key generator circuit or logic that is part of the security circuit 130. In an embodiment, the private key generator 133 may read the encoded private key from the NVM 160 for message decryption, every time the image sensor 100 is booted, and may decode the read encoded private key according to a predetermined method, to generate the private key.

The NVM 160 may be implemented to store a public key and an encoded (or a changed) private key. In an embodiment, the public key and the encoded private key may be stored in the NVM 160 in manufacturing the image sensor 100. In an embodiment, the NVM 160 may be implemented as an one-time programmable (OTP) memory. In another embodiment, the NVM 160 may be implemented as a NAND flash memory, a vertical NAND flash memory, a NOR flash memory, a resistive random access memory (RRAM), a phase-change memory (PRAM), a magneto-resistive random access memory (MRAM), a ferroelectric random access memory (FRAM), a spin transfer torque random access memory (STT-RAM), or the like.

The interface circuit 170 may transmit acquired image data IMG and a security image to which the tag is attached, to the controller 200, according to a predetermined interface standard. In an embodiment, the interface standard may be a mobile industry processor interface (MIPI) standard, an MIPI automotive SerDes solution (MASS) standard, a DisplayPort standard, or the like.

The controller 200 may be implemented to perform an authentication operation with the image sensor 100. The controller 200 may transmit a cipher text CT encrypted with the public key of the image sensor 100 to the image sensor 100. In this case, the cipher text CT may be transmitted through an interface standard such as an inter-integrated circuit (I2C), a serial peripheral interface (SPI), a universal asynchronous receiver/transmitter (UART), or the like.

In addition, the controller 200 may be implemented to receive security image data (e.g., IMG and tag) transmitted from the image sensor 100, check integrity of image data thereto, and perform a processing operation on the image data. For example, the controller 200 may be implemented as a semiconductor chip implemented separately from the image sensor 100. In an embodiment, the semiconductor chip may be a system-on-chip (SoC) in which at least one processor and an image processing module are integrated. For example, the controller 200 may be an advanced driver assistance system (ADAS) SOC. In an embodiment, the controller 200 may calculate a MAC value using the received image data IMG and information of a session key shared with the image sensor 100, and may compare the calculated MAC value with a MAC value (e.g., a CMAC) transmitted from the image sensor 100, to verify integrity of the image data IMG transmitted from the image sensor 100.

In addition, the controller 200 may communicate with an external controller in various communication methods, such as controller area network (CAN), media oriented system transport (MOST), local interconnected network (LIN), FlexRay, Ethernet, or the like.

As illustrated in FIG. 1, in the image processing system 10, one controller 200 and one image sensor 100 are illustrated. However, embodiments are not limited thereto, and according to various embodiments, the image processing system 10 may be implemented to have various other forms. An image processing system according to other embodiments may include a plurality of controllers 200 and/or a plurality of image sensors 100 and may be implemented by variously combining the number of controllers or the number of image sensors.

The controller 200 may analyze a large amount of images received from each camera sensor, may interpret current traffic conditions and obstacles based thereon, and may then execute device control for subsequent operations in real time. At the same time, the controller 200 may perform a security processing operation to confirm whether an image is transmitted from a correct camera device and whether forgery or tampering has occurred in a process of transmitting the image.

The controller 200 may include a security module 201 that performs the above-described security function. In various embodiments, the security module 201 may be implemented in software, hardware, and/or firmware. In general, the security module 201 may refer to a cryptographic processor specially designed for protecting a lifecycle of an encryption key. The security module 201 may perform cryptographic processing, key protection, and key management within an enhanced anti-counterfeiting device.

In some embodiments, the security module 201 may be a hardware security module (HSM). In general, an HSM used in a vehicle controller domain may include a secure memory for safely storing a key. For example, the secure memory may include an HSM dedicated random access memory (RAM) or a read only memory (ROM) with high security, separate from a host system. The HSM may perform a series of operations through a dedicated central processing unit (CPU) to perform functions relatively safely from attacks by potential attackers.

A related art vehicle image processing system may include a hardware block in which a security function is mounted on an image sensor. Such a hardware block may receive an encrypted message from a host, and may decrypt the encrypted message. During this decryption operation, it may be necessary to load a private key stored in a non-volatile memory in the image sensor into a decryption module. In this case, a DPA attack may be performed by an attacker. When the private key is stored in the non-volatile memory as a raw value, the private key may be leaked externally by the DPA attack.

By contrast, in the image processing system 10 according to some embodiments, an encoded (or changed/converted) private key with immunity to the DPA attack from the NVM 160 may be loaded into the security circuit 130 of the image sensor 100, to incapacitate the DPA attack on the private key, even when receiving the DPA attack. For example, the image sensor 100 in FIG. 1 may store the encoded private key to be efficiently restored, to block the DPA attack at the time of loading the private key and perform a relatively fast security processing operation, at the same time.

Figure 2A:
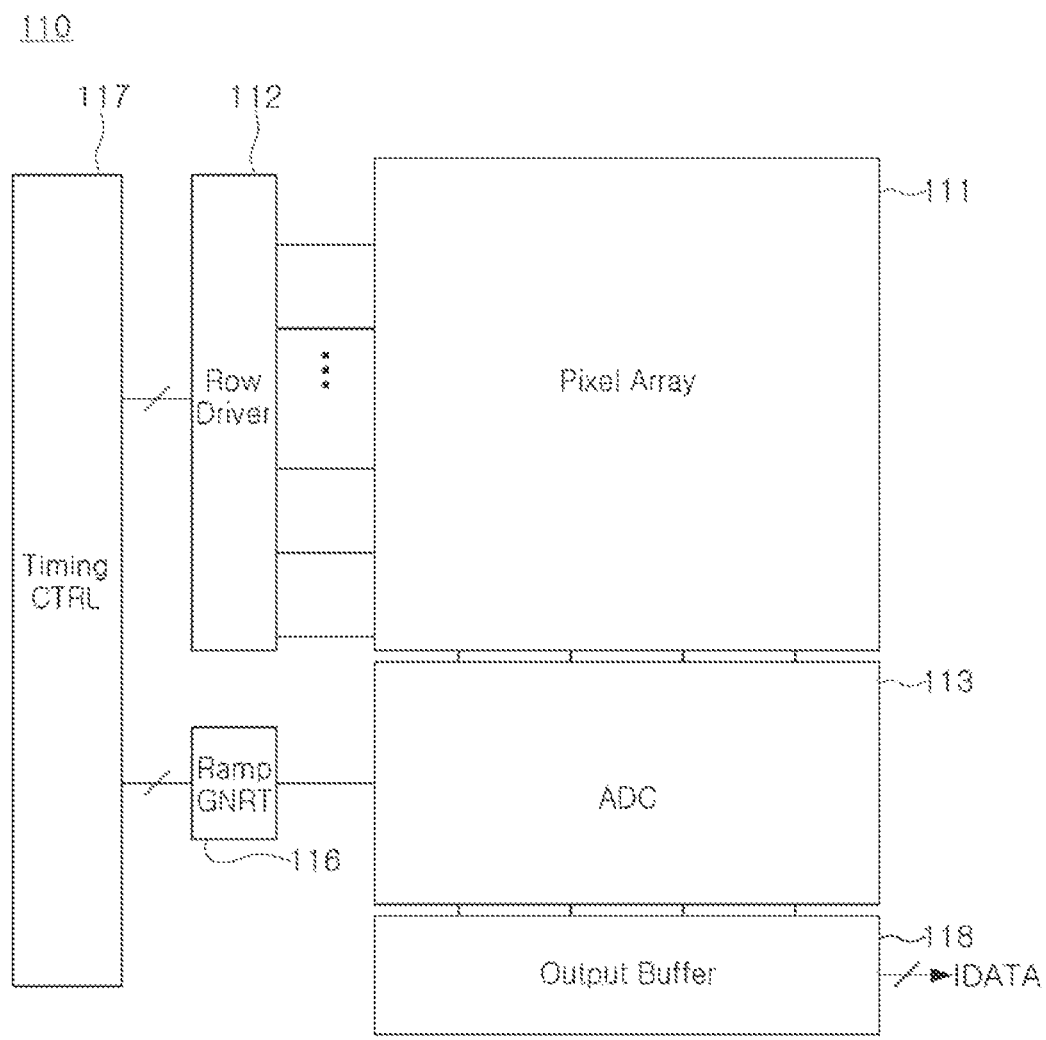
FIG. 2A is a view illustrating an image sensing circuit according to some embodiments.

FIG. 2A is a view illustrating an image sensing circuit 110 according to some embodiments. Referring to FIG. 2A, the image sensing circuit 110 may include a pixel array 111, a row driver 112, an analog-to-digital converter (ADC) 113, a ramp voltage generator (Ramp GNRT) 116, a timing controller (CTRL) 117, and an output buffer 118.

The pixel array 111 may include a plurality of pixels arranged in a matrix form, each of which is connected to a plurality of row lines and a plurality of column lines. Each of the plurality of pixels may include a photosensing device.

For example, the photosensing device may include a photodiode, a phototransistor, a port gate, or a pinned photodiode.

Each of the plurality of pixels may include at least one photosensing device. In an embodiment, each of the plurality of pixels may include a plurality of photosensing devices. The plurality of photosensing devices may be stacked on each other. Each of the plurality of pixels may sense light using the photosensing device, and may convert the light into a pixel signal which may be an electrical signal. Each of the plurality of pixels may sense light within a specific spectral region. For example, the plurality of pixels may include a red pixel for converting light in a red spectral region into an electrical signal, a green pixel for converting light in a green spectral region into an electrical signal, and a blue pixel for converting light in a blue spectral region into an electrical signal. A color filter for transmitting light of a specific spectral region may be disposed on each of the plurality of pixels.

In an embodiment, each of the plurality of pixels may include a pixel group having various color patterns on which the row lines and the column lines intersect. In this case, the pixel group may be implemented to have a 2×2 Bayer pattern, a 4×4 Tetra pattern, or an 8×8 Q-cell pattern, or may be implemented to have an infrared sub-pixel. In an embodiment, the pixel array 111 may be implemented with pixels suitable for a dynamic vision sensor.

The row driver 112 may be implemented to drive the pixel array 111 in a row unit. The row driver 112 may decode a row control signal (e.g., an address signal) generated by the timing controller 170, and may select at least one of the row lines included in the pixel array 111 in response to the decoded row control signal. For example, the row driver 112 may generate a row selection signal. The pixel array 111 may also output a pixel signal from a row selected by the row selection signal provided by the row driver 112. The pixel signal may include a reset signal and an image signal.

The analog-to-digital converter (ADC) 113 may be implemented to convert an analog pixel signal input from the pixel array 111 into digital data. The analog-to-digital converter 113 may include a comparison circuit and a counter circuit. The comparison circuit may be configured to compare a pixel signal output by a unit pixel connected to one of column lines included in the pixel array 111, with a ramp voltage. The comparison circuit may include a plurality of comparators provided to correspond to each column. Each of the comparators may be connected to the pixel array 111 and the ramp voltage generator 116. The comparator may be configured to compare the pixel signal with the received ramp voltage RAMP generated by the ramp voltage generator (Ramp GNRT) 116, and to output a comparison result signal to an output terminal.

The counter circuit of the analog-to-digital converter (ADC) may include a plurality of counters. Each of the plurality of counters may be connected to the output terminal of the comparators, and may be configured to count based on the output of each comparator. A counter control signal may include a counter activation signal, a counter clock signal, a counter reset signal for controlling a reset operation of the plurality of counters, an inverting signal for inverting internal bits of each of the plurality of counters, or the like. The counter circuit may count a comparison result signal according to the counter clock signal, to output the signal as digital data. The counter may include an up/down counter or a bit-wise counter. In this case, the bit-wise counter may perform an operation similar to that of the up/down counter. For example, the bit-wise counter may perform a function of only up-counting, and may perform a function of inverting entire bits in the counter into 1's complements, when a specific signal comes in. The bit-wise counter may perform a reset count, and may invert the count into 1's complements, that is, a negative value.

The ramp voltage generator (Ramp GNRT) 116 may be implemented to generate a ramp voltage RAMP. The ramp voltage generator 116 may operate based on a ramp control signal provided by a timing controller 117. The ramp control signal may include a ramp enable signal, a mode signal, and the like. When the ramp enable signal is activated, the ramp voltage generator 116 may generate a ramp voltage RAMP having a slope determined based on the mode signal.

The timing controller (CTRL) 117 may be implemented to control operations or timings of the row driver 112, the analog-to-digital converter 113, and the ramp voltage generator 116 by outputting a control signal or a clock signal to each of the row driver 112, the analog-to-digital converter 113, and the ramp voltage generator 116. The timing controller 117 may also generate switching control signals provided to the comparison circuit to differentiate decision speeds, depending on a column line group.

The output buffer 118 may be implemented to temporarily store, amplify and output digital data output by the analog-to-digital converter 113. The output buffer 118 may include a column memory block and a sense amplifier circuit. The column memory block may include a plurality of memories. Each of the plurality of memories may temporarily store digital data output by each of the plurality of counters and may output the digital data to the sense amplifier circuit. The sense amplifier circuit may be implemented to sense and amplify digital data output by the plurality of memories. The sense amplifier circuit may output the amplified digital data IDATA to the signal processor 120 (refer to FIG. 1) as image data.

Figure 2B:
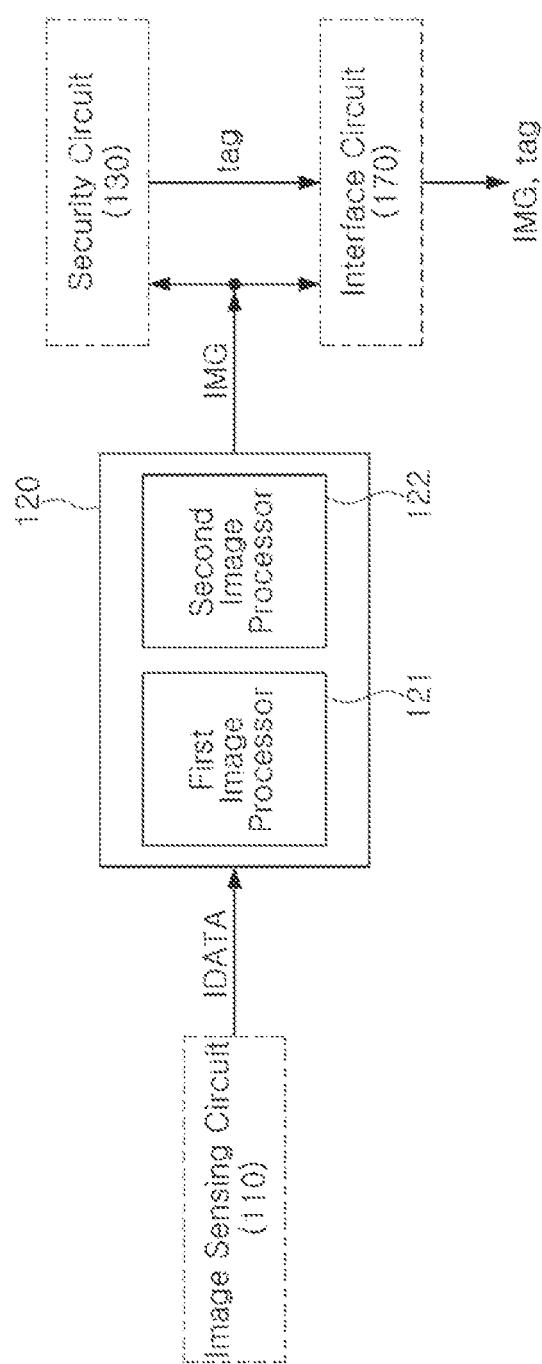
FIG. 2B is a view illustrating a signal processor according to some embodiments.

FIG. 2B is a view illustrating a signal processor 120 according to some embodiments. Referring to FIG. 2B, a signal processor 120 may include a first image processor 121 and a second image processor 122.

The signal processor 120 may be implemented to receive an image signal IDATA acquired from the image sensing circuit 110, perform at least one image processing operation on the image signal IDATA, and output the processed image data IDATA to an external entity.

Processing performed by at least one of the first image processor 121 and the second image processor 122 may include generating a depth map, 3D modeling, generating a panorama, extracting feature points, synthesizing an image, or compensating an image (e.g., reducing noise, adjusting resolution, adjusting brightness, bluffing, sharpening, softening). The signal processor 120 may also perform exposure time control, readout timing control, or the like.

In addition, the image data IMG output from the signal processor 120 may be transmitted to the security circuit 130 and the interface circuit 170. The security circuit 130 may receive the image data IMG, and may generate a tag for integrity of the image data IMG for all or a portion of the image data IMG. The tag may be, for example, a MAC value, e.g., a CMAC. The interface circuit 170 may receive the image data IMG from the signal processor 120, may receive the tag from the security circuit 130, may generate a security image conforming to the interface standard, and the generated security image may be transmitted to an external device (e.g., the controller 200).

Figure 3A:
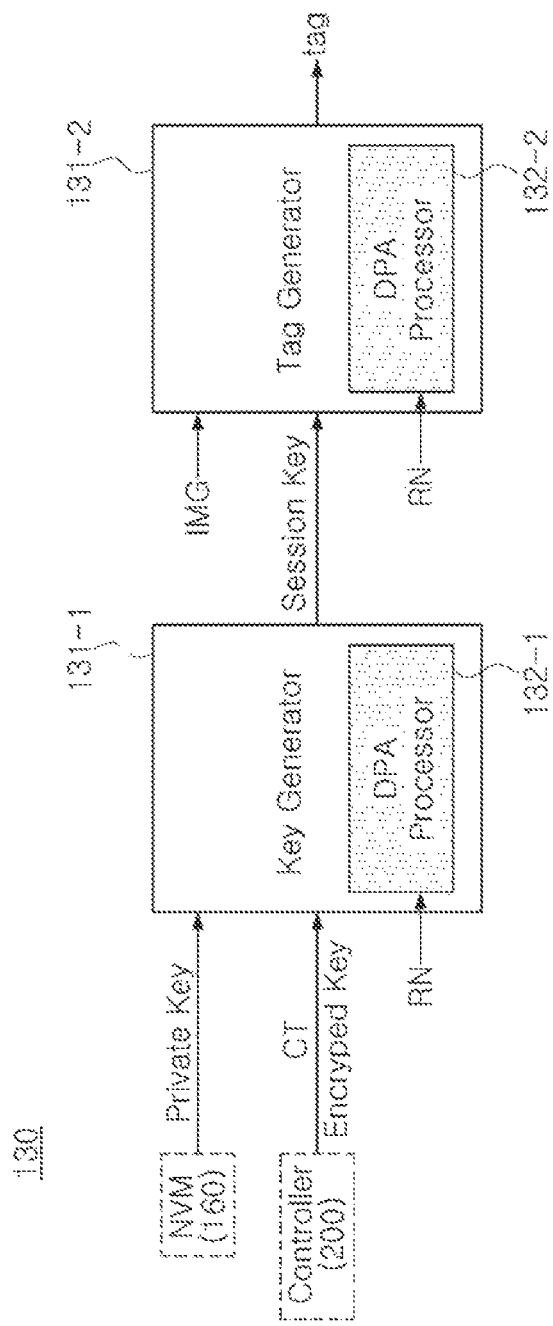
FIGS. 3A and 3B are views illustrating a crypto module according to some embodiments.
Figure 3B:
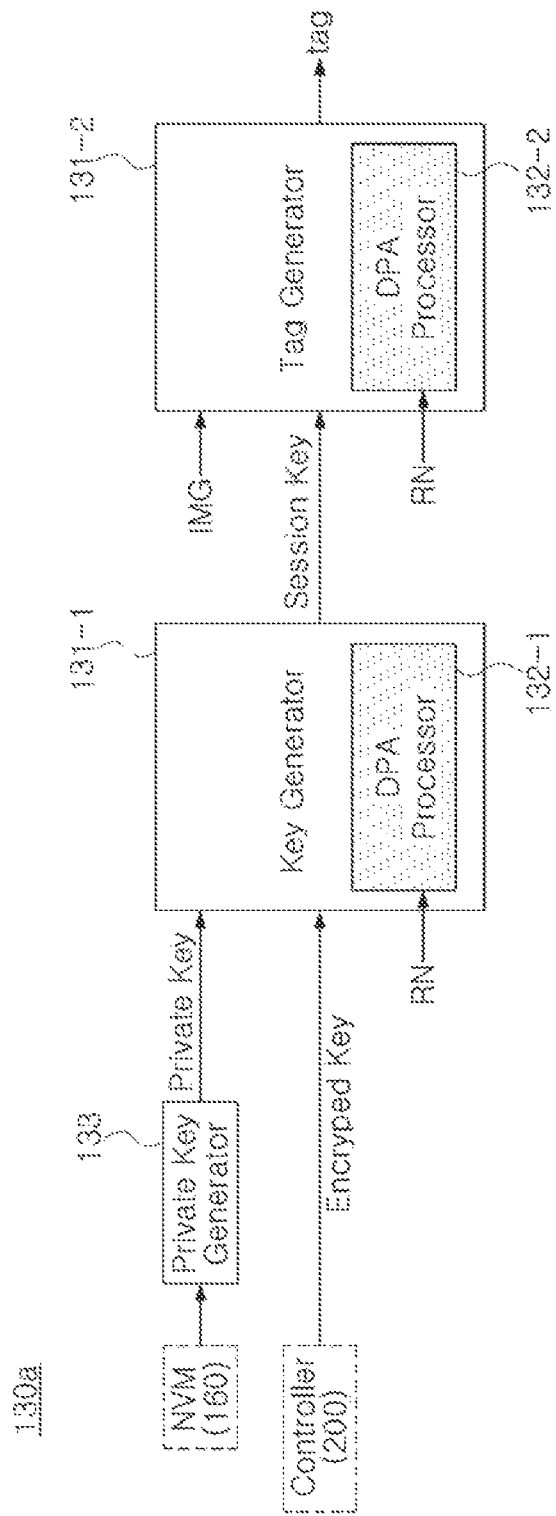

FIGS. 3A and 3B are views illustrating a crypto module according to some embodiments.

Referring to FIG. 3A, a security circuit 130 may include a key generator 131-1 and a tag generator 131-2. The key generator 131-1 may be implemented to receive an encrypted key and generate a session key. The session key may be an n-bit session key. The encrypted key may be transmitted from the controller 200. In an embodiment, the encrypted key may be included in a cipher text CT as described with respect to FIG. 1. The encrypted key may be decrypted by a private key of an image sensor 100. In this case, the private key may be loaded from the NVM 160 in the image sensor 100 during the decryption operation. In addition, the key generator 131-1 may include a DPA processor 132-1 that prevents exposure of the private key or the session key therein using a random number RN.

The tag generator 131-2 may be implemented to receive image data IMG and the session key, and to generate a tag corresponding to the image data IMG. In this case, the image data IMG may be received from a signal processor 120 (refer to FIG. 1). The session key may be received from the key generator 131-1. Also, the tag generator 131-2 may include a DPA processor 132-2 that prevents exposure of the session key therein using a random number RN during a tag generation operation.

A security circuit according to some embodiments may load a encoded private key to prevent a DPA attack from the NVM, and may restore the loaded encoded private key to use the restored private key for the decryption operation of the cipher text CT.

Referring to FIG. 3B, a security circuit 130a may include the key generator 131-1, the tag generator 131-2, and a private key generator 133. The private key generator 133 may be implemented to load a encoded private key from a NVM 160 during a decryption operation, and restore the loaded encoded private key to generate a private key. The remaining elements of the security circuit 130a are similar in structure and function to like elements of the security circuit 130 of FIG. 3A, and thus a repeated description thereof is omitted for conciseness.

Figure 4A:
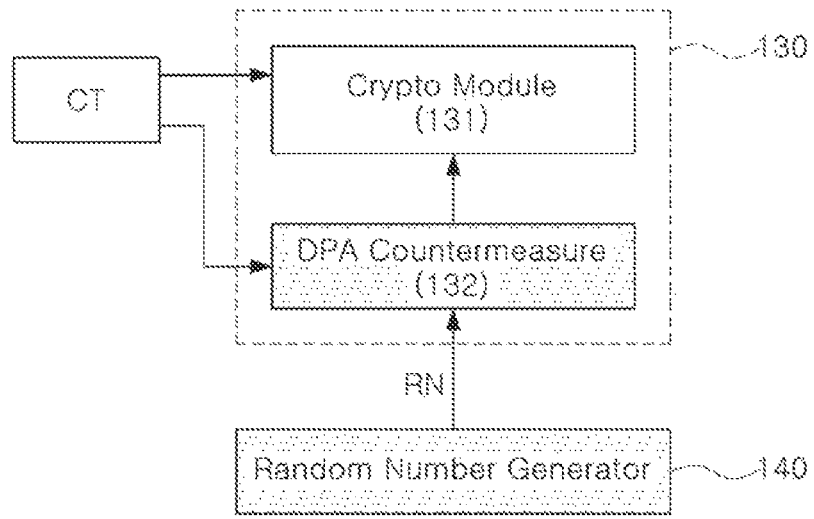
FIGS. 4A, 4B, and 4C are views illustrating a method for generating a random number for performing a differential power analysis (DPA) countermeasures operation in a security circuit according to some embodiments.
Figure 4B:
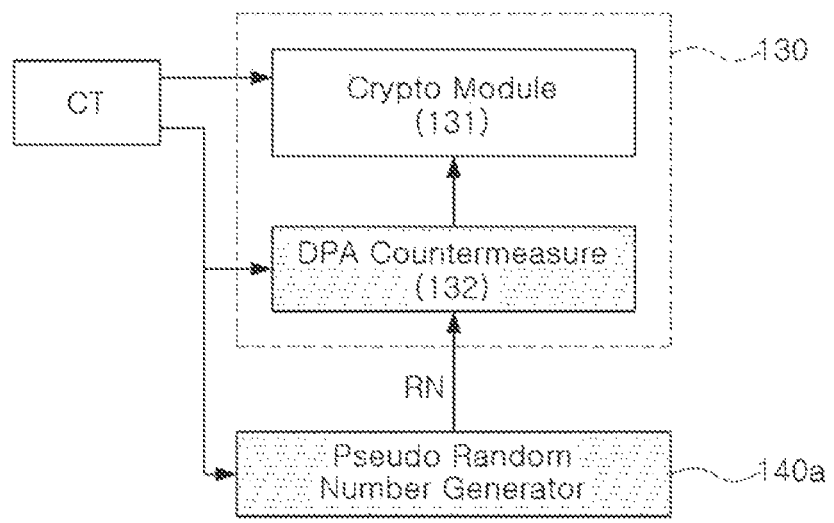
Figure 4C:
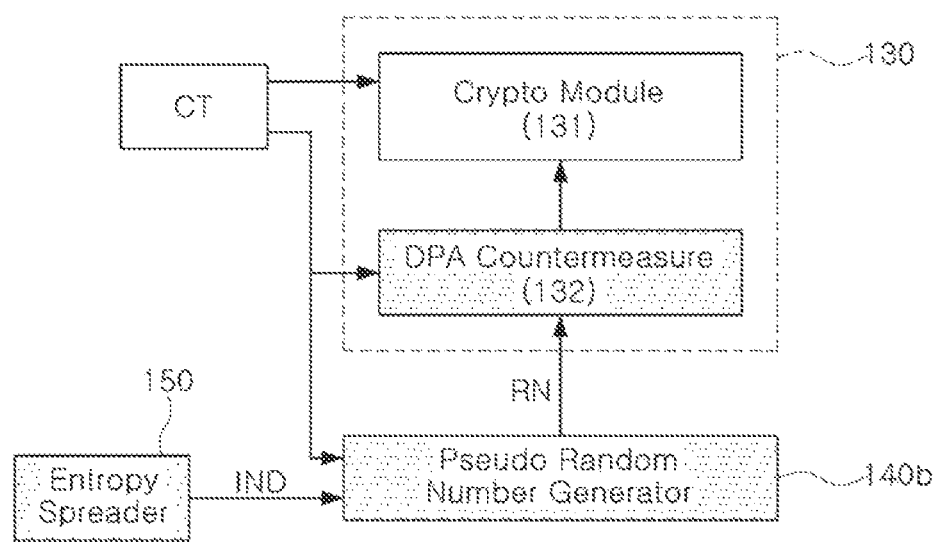

FIGS. 4A, 4B, and 4C are views illustrating a method for generating a random number for performing a DPA countermeasures operation in a security circuit according to some embodiments.

Referring to FIG. 4A, during a decryption operation of a cipher text CT, a random number generator 140 may be implemented to generate a random number RN for protecting a private key from a DPA attack, and provide the random number RN to a secure circuit 130. In an embodiment, the random number generator 140 may be implemented as a true random number generator. The true random number generator may generate a random number, which may not have periodicity and regularity. In another embodiment, the random number generator 140 may be implemented as a pseudo-random number generator.

In general, a cipher text may be data acquired by applying various security algorithms to a plain text in a controller. Therefore, the cipher text itself may be guaranteed to have randomness. In particular, in specific security algorithms such as RAS encryption scheme (RSAES)-optimal asymmetric encryption padding (OAEP) or elliptic curve cryptography (ECC), an SHA function may be used during an encryption operation. In this case, even when plain texts, which are identical to each other, are encrypted, cipher texts to be generated are different from each other. For example, randomness may be already included at the time the cipher texts are generated.

In general, a cipher text may be generated by encrypting a plain text (original data) in a host through a security algorithm (e.g., RSA, ECC) or the like. During an encryption operation, unless a key is leaked, a third party cannot extract the plain text from the cipher text. During the encryption operation, randomness may be given to the cipher text in the host. In particular, even when the encryption operation is performed by repeating the same plain text, randomness may be provided at each execution time of the encryption operation. Therefore, cipher texts generated every time from the same plain text may have different values. For example, when a plain text of "0x01234567" is encrypted at a first time point with a key (A), a cipher text of "0x373a8897" may be generated. When a plain text of "0x01234567", which is identical to the above, is encrypted at a second time point with the key (A), a cipher text of "0x0a7c674d" may be generated.

The security circuit 130 may include an entropy spreader that generates an index for extracting randomness of the cipher text CT.

Referring to FIG. 4B, a pseudo-random number generator 140a may be implemented to generate a random number RN using randomness of a cipher text CT.

Referring to FIG. 4C, a pseudo-random number generator 140b may be implemented to select a portion of a cipher text CT, according to a value of an index IND, to generate a random number RN. In this case, the index IND may be generated by an entropy spreader 150. In this case, the entropy spreader 150 may include a circuit for generating an index IND for extracting a random number from a cipher text in a system. The entropy spreader 150 may be implemented to receive the cipher text CT and generate the index IND for extracting randomness of the cipher text CT.

Figure 5A:
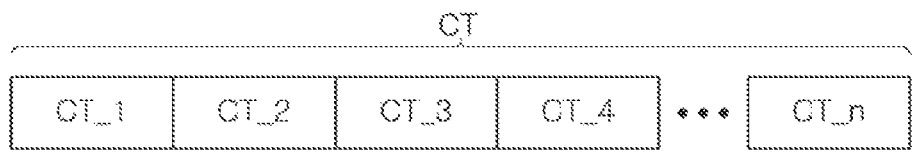
FIGS. 5A and 5B are views illustrating a process for generating a random number from a cipher text using an entropy spreader according to some embodiments.
Figure 5B:
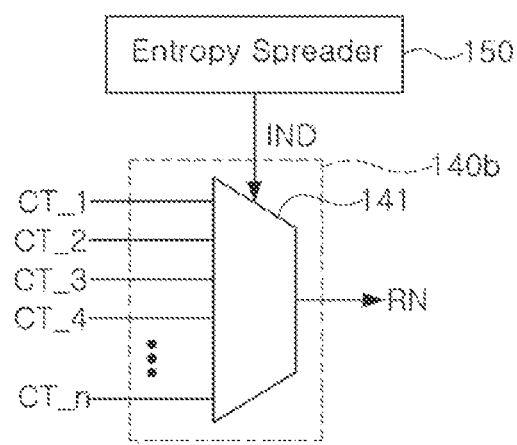

FIGS. 5A and 5B are views illustrating a process for generating a random number from a cipher text CT using an entropy spreader according to some embodiments. As illustrated in FIG. 5A, a cipher text CT may include a plurality of divided data (CT_1, CT_2, CT_3, CT_4, . . . , CT_n, where n is an integer of 2 or more). In some embodiments, sizes of the divided data CT_1, . . . , CT_n may be equal to each other. In other embodiments, sizes of the divided data CT_1, . . . , CT_n may be different from each other. In some embodiments, at least two of the divided data CT_1, . . . , CT_n may share some bits. As illustrated in FIG. 5B, an entropy spreader 150 may be implemented to generate an index IND. A pseudo-random number generator 140b may include a multiplexer 141 that selects one of divided data CT_1, . . . , CT_n as a random number RN according to the index IND.

An entropy spreader according to some embodiments may be implemented in various manners.

Figure 6A:
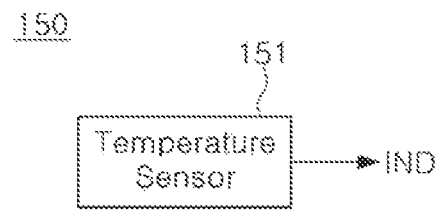
FIGS. 6A, 6B, and 6C are views illustrating examples of an entropy spreader according to some embodiments.
Figure 6B:
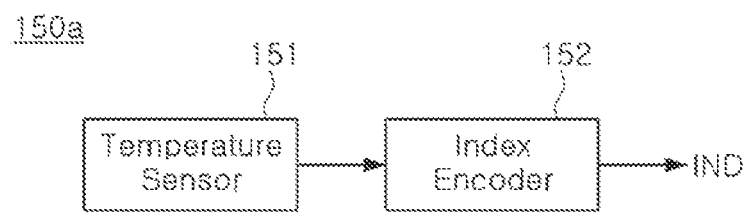
Figure 6C:
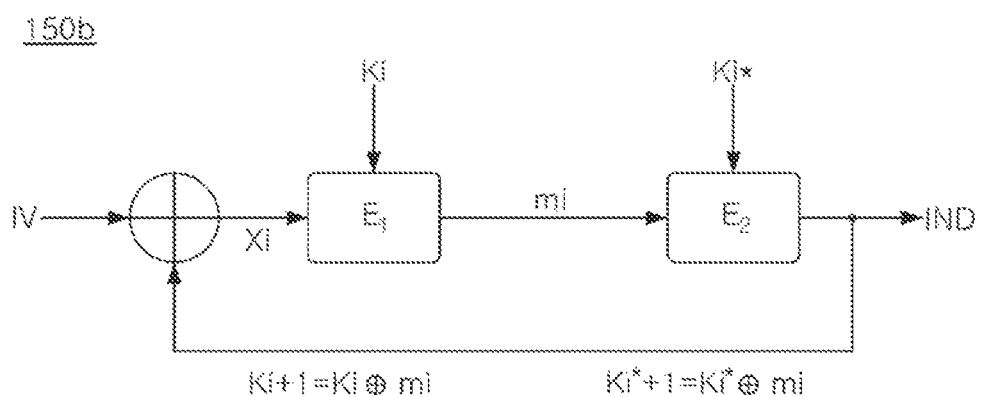

FIGS. 6A, 6B, and 6C are views illustrating examples of an entropy spreader according to some embodiments.

Referring to FIG. 6A, an entropy spreader 150 may be implemented using a temperature sensor 151. The temperature sensor 151 may output an index IND having a plurality of bits. In an embodiment, the temperature sensor 151 may be disposed inside an image sensing circuit 110 (refer to FIG. 1) or outside the image sensing circuit 110. The entropy spreader 150 may directly use temperature information sensed from the temperature sensor 151 as the index IND.

As illustrated in FIG. 6A, the entropy spreader 150 uses the temperature information as it is, as the index IND. It should be understood that embodiments are not limited thereto. An entropy spreader may change detected temperature information and use the changed temperature information as the index IND.

Referring to FIG. 6B, an entropy spreader 150a may include a temperature sensor 151 and an index encoder 152.

The index encoder 152 may be implemented to receive temperature information of the temperature sensor 151, and output an index IND having a plurality of bits corresponding to the temperature information.

An entropy spreader according to various embodiments may be implemented using a pseudo-random number generator PRNG. In this case, the pseudo-random number generator PRNG may be implemented in various manners.

Referring to FIG. 6C, an entropy spreader 150b may be implemented using a block cipher-based pseudo-random number generator BPRNG. The entropy spreader 150b may output an index IND by using an initial vector IV and keys ki and ki* of an image sensor 100 (see FIG. 1) to perform block encryption operations E1 and E2 a predetermined number of times. In this case, the initial vector IV may be a cipher text CT.

In an embodiment, the block cipher-based pseudo-random number generator may be implemented using an internal block encryption algorithm of a security circuit 130 (refer to FIG. 1). For example, the block cipher-based pseudo-random number generator may be implemented in software and/or firmware. In another embodiment, the entropy spreader may generate an index using a hash algorithm. An entropy spreader according to some embodiments may generate an index using a cipher text and an encryption algorithm.

Figure 7A:
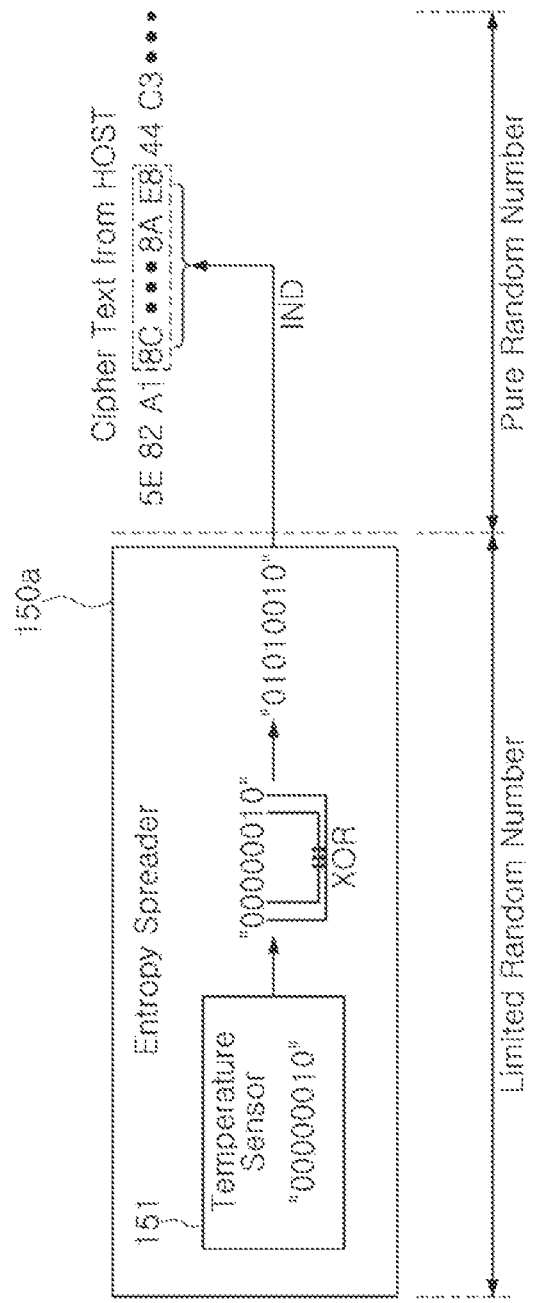
FIGS. 7A, 7B, and 7C are views illustrating a process for selecting a random number from a cipher text using an entropy spreader according to some embodiments.
Figure 7B:
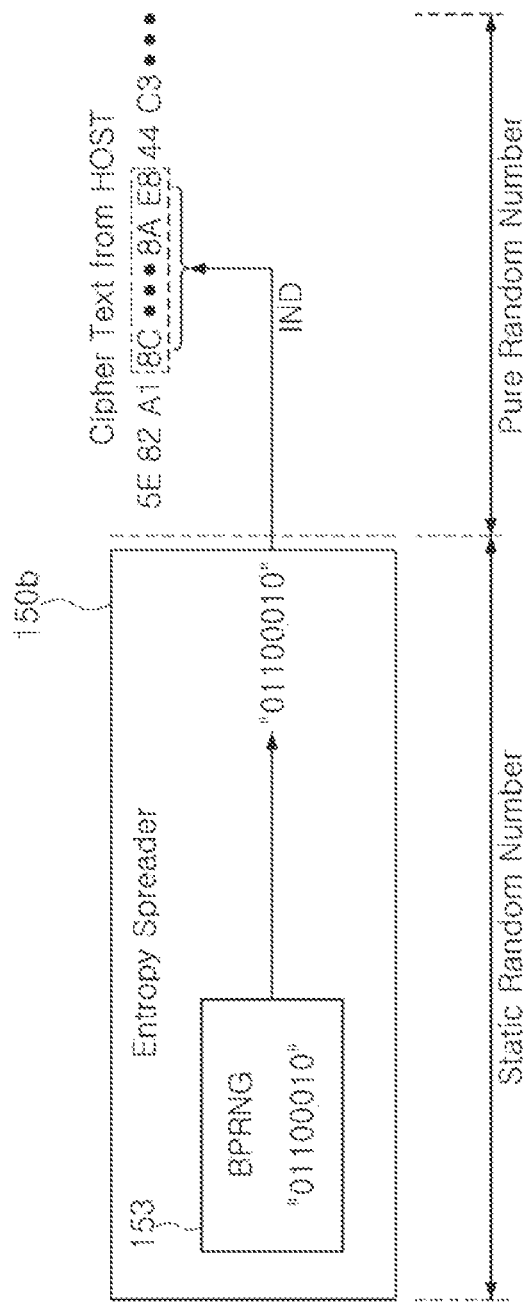
Figure 7C:
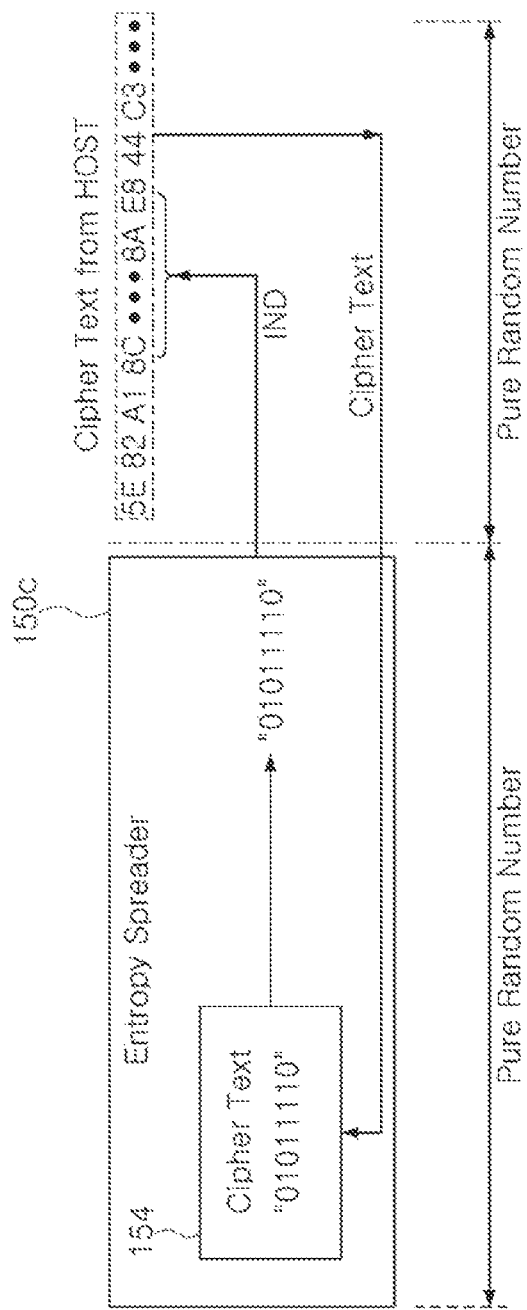

FIGS. 7A, 7B, and 7C are views illustrating a process for selecting a random number from a cipher text using an entropy spreader according to some embodiments.

Referring to FIG. 7A, the entropy spreader 150a may be implemented using the temperature sensor 151. The entropy spreader 150a may perform an XOR operation on internal bits of an output value (e.g., "00000010") of the temperature sensor 151, according to a predetermined order, to generate an index IND. According to the index IND, a portion (e.g., BC . . . BAE8) of a cipher text may be selected as a random number RN. A method of outputting the index IND using the temperature sensor 151 may generate a limited random number due to temperature characteristics.

Referring to FIG. 7B, the entropy spreader 150b may be implemented using a block cipher-based pseudo-random number generator 153 (BPRNG). The block cipher-based pseudo-random number generator 153 may generate a static random number using the block pseudo-random number.

The entropy spreaders illustrated in FIGS. 7A and 7B may use a value output from a specific block in a system as it is, and as a seed (or an index) of a random number. However, embodiments are not be limited thereto. An entropy spreader according to various embodiments may extract a random number using a cipher text.

Referring to FIG. 7C, an entropy spreader 150c may extract an index IND from a cipher text received from a controller 200 (refer to FIG. 1). In this case, the extracted index IND may be a pure random number due to usage of the cipher text.

Figure 8A:
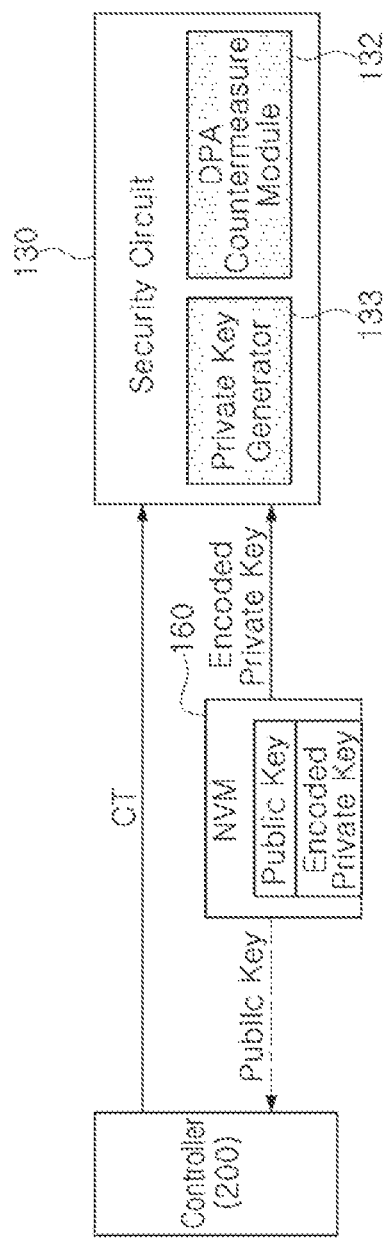
FIGS. 8A and 8B are views illustrating a process for transferring a private key used in a DPA countermeasure module according to some embodiments.
Figure 8B:
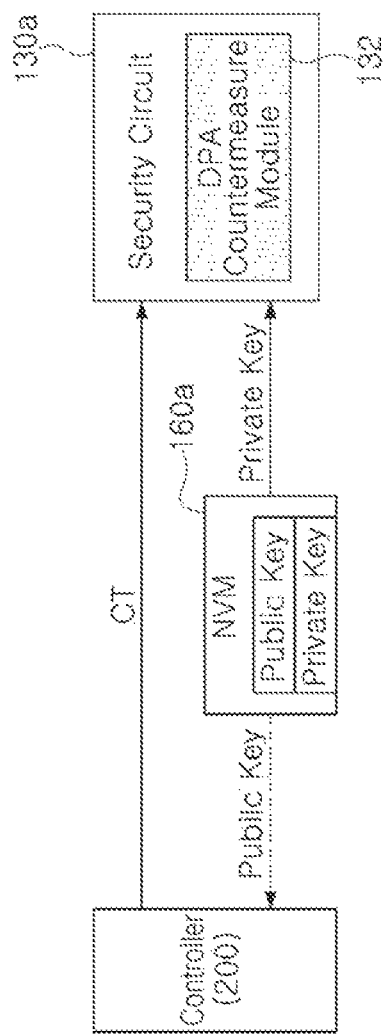

FIGS. 8A and 8B are views illustrating a process for transferring a private key used in a DPA countermeasure module according to some embodiments.

Referring to FIG. 8A, an NVM 160 may store a public key and an encoded private key of an image sensor 100. According to an authentication request of the controller 200, the public key of the image sensor 100 may be transmitted from the NVM 160 to the controller 200. In addition, for decryption of a cipher text CT, the encoded private key of the image sensor 100 may be loaded into a security circuit 130 from the NVM 160. The security circuit 130 may include the DPA countermeasure module 132 and the private key generator 133. The private key generator 133 may read the encoded private key from the NVM 160 every time the image sensor 100 boots, and may decode the read encoded private key, according to a predetermined method, to generate a private key. The security circuit 130 may perform a decryption operation of the cipher text CT using the private key restored by the private key generator 133.

In addition, the security circuit 130 may prevent a DPA attack on the private key using the DPA countermeasure module 132 during the decryption operation using the private key. For example, the DPA countermeasure module 132 may protect the private key by a masking technique using a random number. In general, a masking technique may perform a masking operation before an encryption operation to randomize an input to be used in the encryption operation, and may further perform an unmasking operation after the encryption operation to derive an equivalent operation result as a result.

An NVM according to some embodiments may store a private key, instead of an encoded private key. Referring to FIG. 8B, an NVM 160a may store a public key and a private key. A security circuit 130a may read the private key stored in the NVM 160a every time an image sensor 100 boots, and may perform a DPA security module 132 using the private key.

Figure 9A:
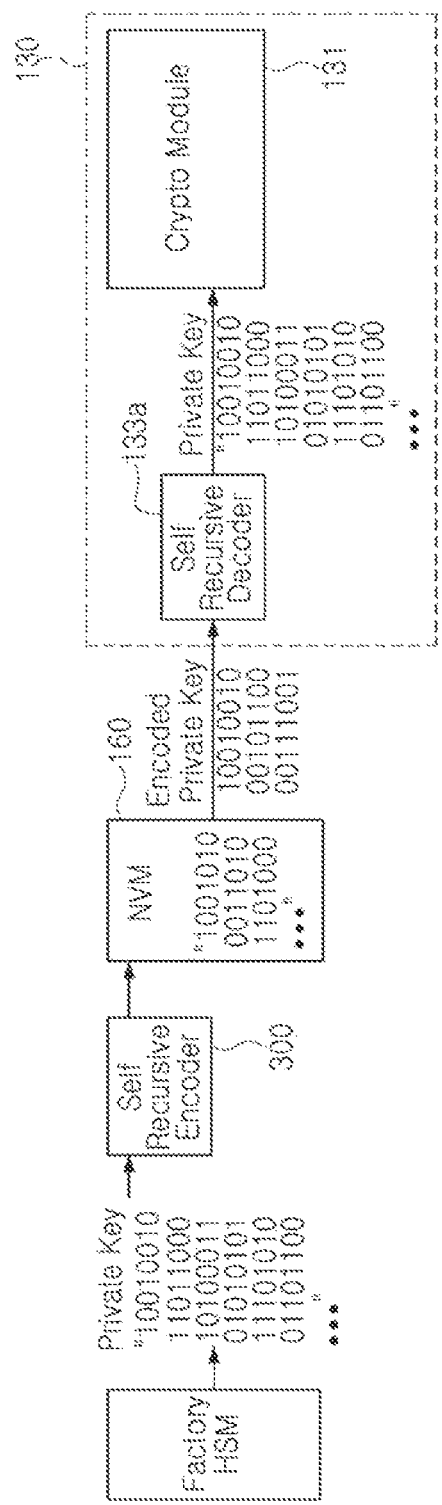
FIGS. 9A and 9B are views illustrating a process for using a private key used in DPA countermeasures according to some embodiments.
Figure 9B:
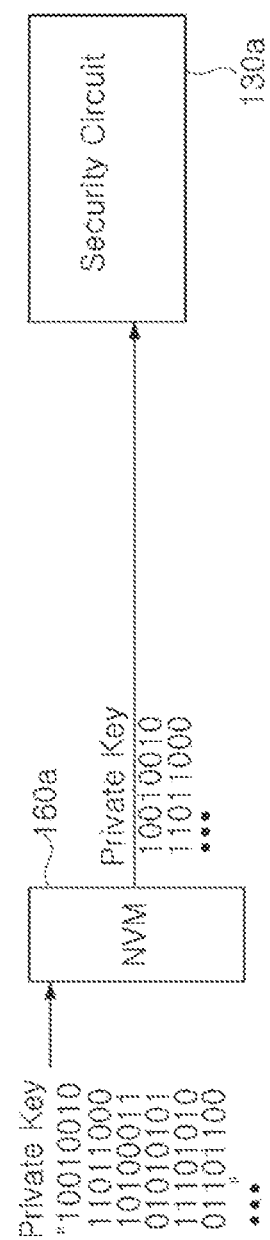

FIGS. 9A and 9B are views illustrating a process for using a private key used in DPA countermeasures according to some embodiments.

Referring to FIG. 9A, a factory hardware security module (HSM) may generate a private key corresponding to an image sensor 100. A self-recursive encoder 300 may be implemented to divide data of a predetermined unit of the private key generated in the factory HSM, and store one of the divided data (e.g., first data of "10010010") as a seed value in an NVM 160. In this case, the predetermined unit may be a byte or a word unit. In addition, after the seed value, the self-recursive encoder 300 may be implemented to perform an XOR operation on the data of a predetermined unit and an output value of a random number generator, and store the operated value in the NVM 160. In this case, the random number generator may be a block cipher-based pseudo-random number generator BPRNG.

As illustrated in FIG. 9A, a secure circuit 130 may include the crypto module 131 and a self-recursive decoder 133a. In this case, the self-recursive decoder 133a may be included in the private key generator 133 illustrated in FIG. 1. The self-recursive decoder 133a may read the seed value (e.g., "1001010") of the private key from the NVM 160, and may transmit the same to the crypto module 131. In addition, the self-recursive decoder 133a may sequentially read values operated in the NVM 160, may perform an XOR operation on the read values and the output value of the random number generator, and transmit the operated values to the crypto module 131. Therefore, the private key may be changed in manufacturing the image sensor 100, may be stored in the NVM 160, may be restored in booting the image sensor 100, and may transmitted to the crypto module 131. A private key according to some embodiments may be changed and restored in various manners.

A private key may not be changed and stored in the NVM. Referring to FIG. 9B, a security circuit 130a may sequentially load a private key of a predetermined unit from an NVM 160a during a security operation. The security circuit 130a may read the private key stored in the NVM 160a, and may perform the security operation. In this case, the security operation may be a decryption operation for a cipher text.

Figure 10A:
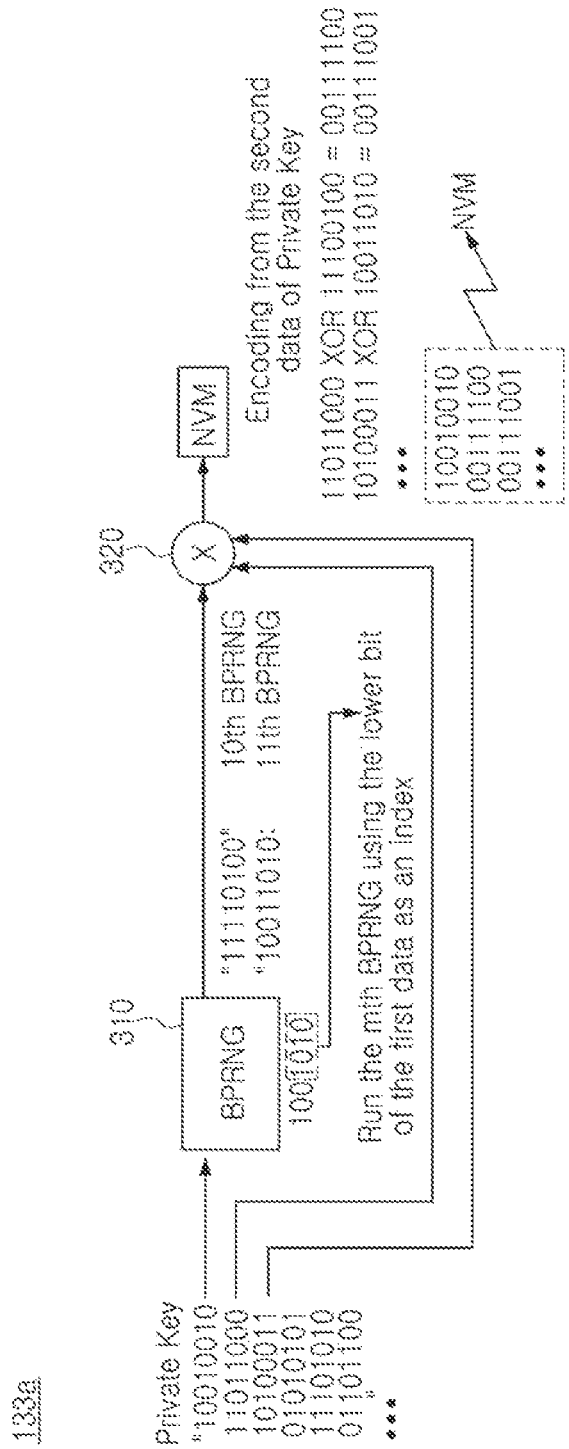
FIG. 10A is a view illustrating a self-recursive encoder according to some embodiments.
Figure 10B:
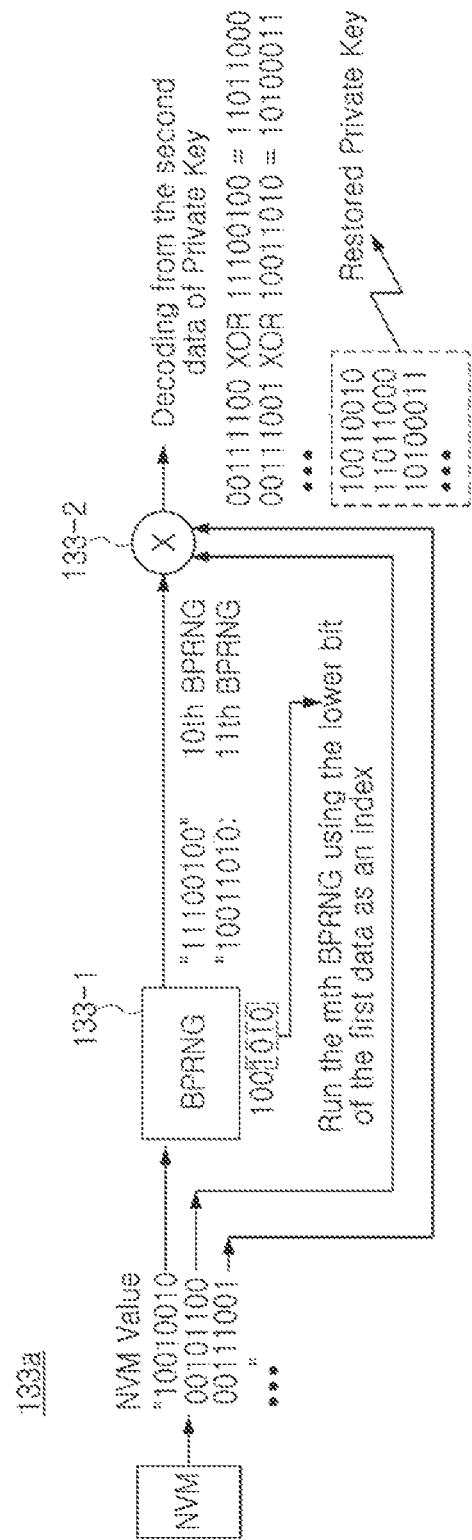
FIG. 10B is a view illustrating a self-recursive decoder according to some embodiments.

FIG. 10A is a view illustrating a self-recursive encoder according to some embodiments, and FIG. 10B is a view illustrating a self-recursive decoder according to some embodiments.

FIG. 10A is a view illustrating a self-recursive encoder 133*a* according to some embodiments. Referring to FIG. 10A, a self-recursive encoder 300 may include a block cipher-based pseudo-random number generator (BPRNG) 310 and an XOR operator 320.

The block cipher-based pseudo-random number generator (BPRNG) 310 may receive first data (e.g., "10011010") of a private key as a seed value. First random numbers may be generated by the block cipher-based pseudo-random number generator 310 using lower bit values ("1010") among the first byte data as an index. The number of driving times of the block cipher-based pseudo-random number generator 310 for generating a Pt first random number among the first random numbers may be determined according to the index. For example, when the index is "1010," the block cipher-based pseudo-random number generator 310 may be repeatedly driven ten (10) times to output a tenth pseudo-random number "11110100." Subsequently, the block cipher-based pseudo-random number generator 310 may be repeatedly driven eleven (11) times to output an eleventh pseudo-random number "10011010."

The index may be determined using a higher bit value of the seed value, instead of using a lower bit value (an m-bit value) of the seed value. According to an embodiment, an index may be a value corresponding to at least one bit of the seed value.

The XOR operator 320 may perform an XOR operation on a private key, excluding the seed value, and an XOR operation on an output value of the block cipher-based pseudo-random number generator 310 by in units of bytes. For example, a value of "00111100" may be output by performing an XOR operation on data of "11011000" following the seed value of the private key and an XOR operation on the tenth pseudo-random number "11110100" of the block cipher-based pseudo-random number generator 310. Then, a value of "00111001" may be output by performing an XOR operation on data of "10100011" and the eleventh pseudo-random number "10011010." As described above, an XOR operation on the divided data of the private key and an XOR operation on the first random number may be sequentially performed. In an embodiment, output values of the XOR operator 320 and the seed value of the private key may be stored in the NVM 160.

FIG. 10B is a view illustrating a self-recursive decoder 133*a* according to some embodiments. Referring to FIG. 10B, a self-recursive decoder 133*a* may include a block cipher-based pseudo-random number generator (BPRNG) 133-1 and an XOR operator 133-2.

The block cipher-based pseudo-random number generator (BPRNG) 133-1 may read a seed value (e.g., "10010010") of a private key from an NVM 160, and second random numbers may be generated by the block cipher-based pseudo-random number generator 133-1 using the seed value as an index. The number of driving times of the block cipher-based pseudo-random number generator 133-1 for generating a $1^{st}$ second random number among the second random numbers may be determined according to the index. For example, when the index is "1010," the block cipher-based pseudo-random number generator 133-1 may be repeatedly driven ten (10) times to output a tenth pseudo-random number "11110100." Subsequently, the block cipher-based pseudo-random number generator 133-1 may be repeatedly driven eleven (11) times to output an eleventh pseudo-random number "10011010." As described above, the second random numbers may be output from the block cipher-based pseudo-random number generator 133-1.

The XOR operator 133-2 may perform an XOR operation on data corresponding to a encoded private key, excluding the seed value, and an XOR operation on an output value of the block cipher-based pseudo-random number generator 133-1. For example, a value "11011000" may be output by performing an XOR operation on data of the encoded private key "00101100" and an XOR operation on the tenth pseudo-random number "11100100" of the block cipher-based pseudo-random number generator 133-1. A value of "10100011" may be output by performing an XOR operation on next data "00111001" of the encoded private key and an XOR operation on the eleventh pseudo-random number "10011010." As described above, an XOR operation on the divided data of the encoded private key and an XOR operation on the second random number may be sequentially performed. In an embodiment, a private key may be restored using the seed value of the private key and the output values of the XOR operator 133-2. The restored private key may be transmitted to a crypto module 131.

It should be understood that a private key may be variously changed. For example, a private key according to some embodiments may be changed by performing an XOR operation without using a random number generator.

Figure 11:
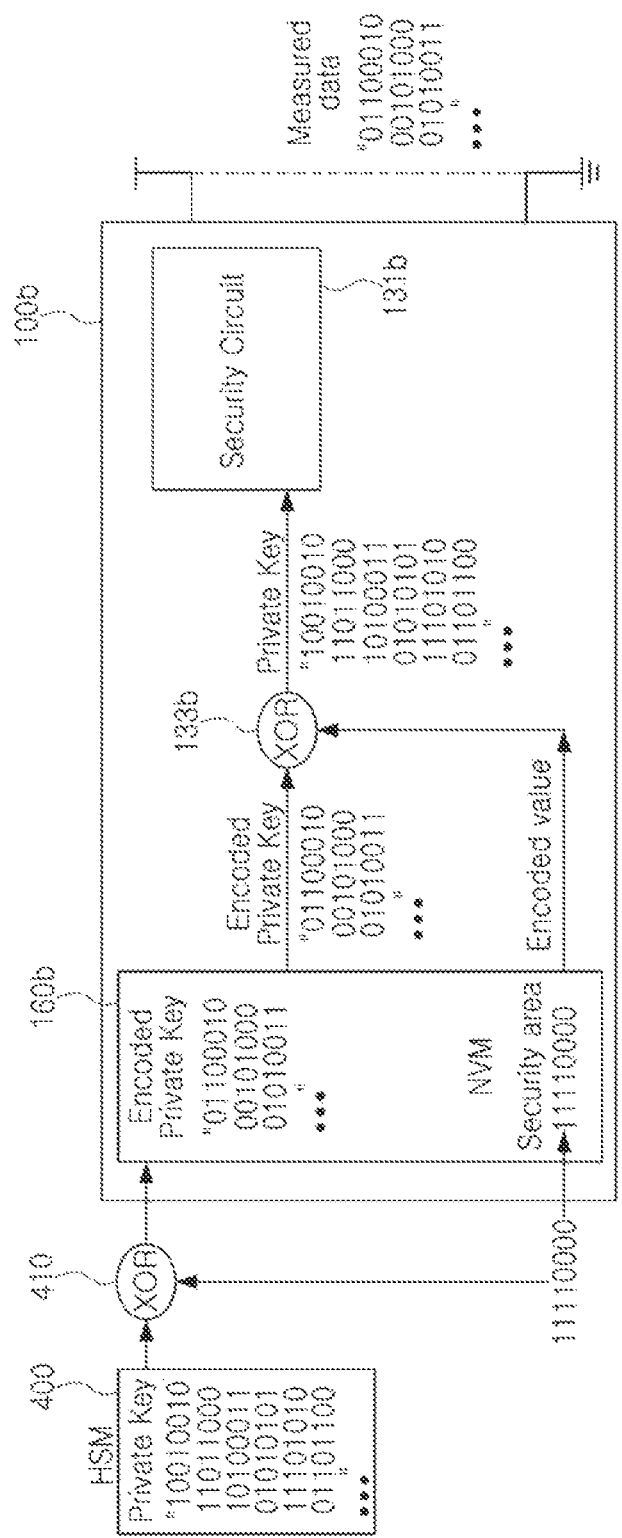
FIG. 11 is a view illustrating a process for transferring a private key used in DPA countermeasures according to another embodiment.

FIG. 11 is a view illustrating a process for transferring a private key used in DPA countermeasures according to another embodiment. Referring to FIG. 11, a private key of an image sensor 100*b* may be generated in a factory HSM. The generated private key may be divided into a plurality of block data, and an XOR operation on each of the block data may be performed by an XOR operator 410 with a predetermined key value. The XOR operated block data and the key value may be stored in an NVM 160*b* in manufacturing the image sensor 100*b*. In a booting operation of the image sensor 100*b*, an operation on the key value stored in the NVM 160*b* and an operation on the operated block data may be sequentially performed by the XOR operator 410, to restore a private key required for an encryption operation. Therefore, the private key of the image sensor 100*b* may be restored. A security circuit 131*b* may perform a decryption operation using the restored private key.

Figure 12A:
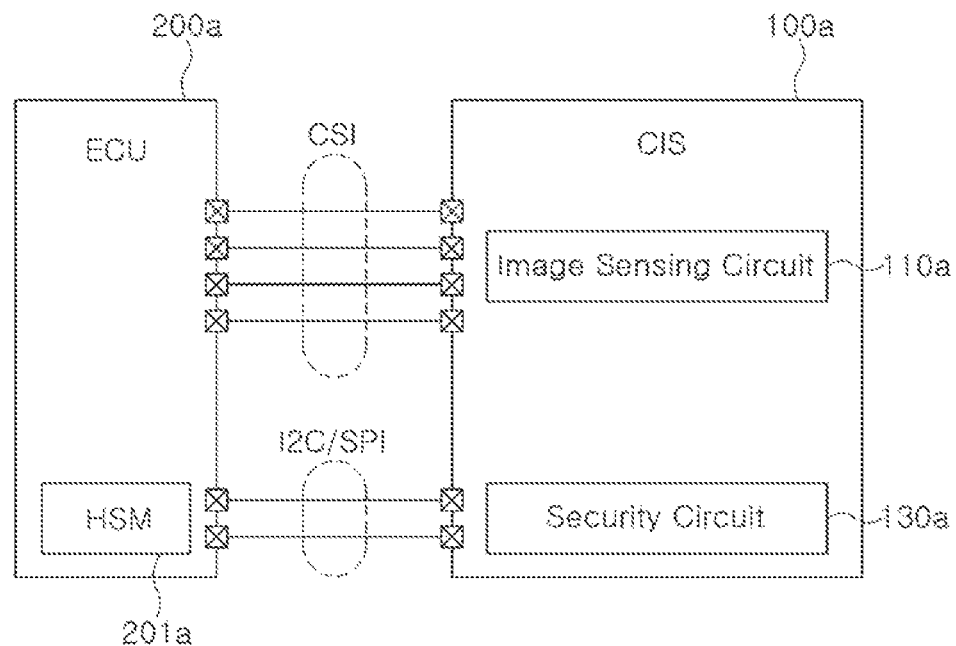
FIGS. 12A and 12B are views illustrating a channel between an image sensor and a controller according to some embodiments.

FIG. 12A is a view illustrating a channel between an image sensor 100*a* and a controller 200*a* such as ISP/AP/ECU/Host according to some embodiments. Referring to FIG. 12A, image data acquired from an image sensor 100*a* may be transmitted to a controller 200*a* through a camera serial interface (CSI) channel (a first channel). In an embodiment, the CSI channel may be a MIPI CSI-2 channel. In addition, a security circuit 130*a* of the image sensor 100*a* and a security module 201*a* (HSM) of the controller 200*a* may communicate data for a security operation through a side channel (a second channel). In this case, the side channel may be implemented as an I2C interface, an SPI interface, or the like.

Figure 12B:
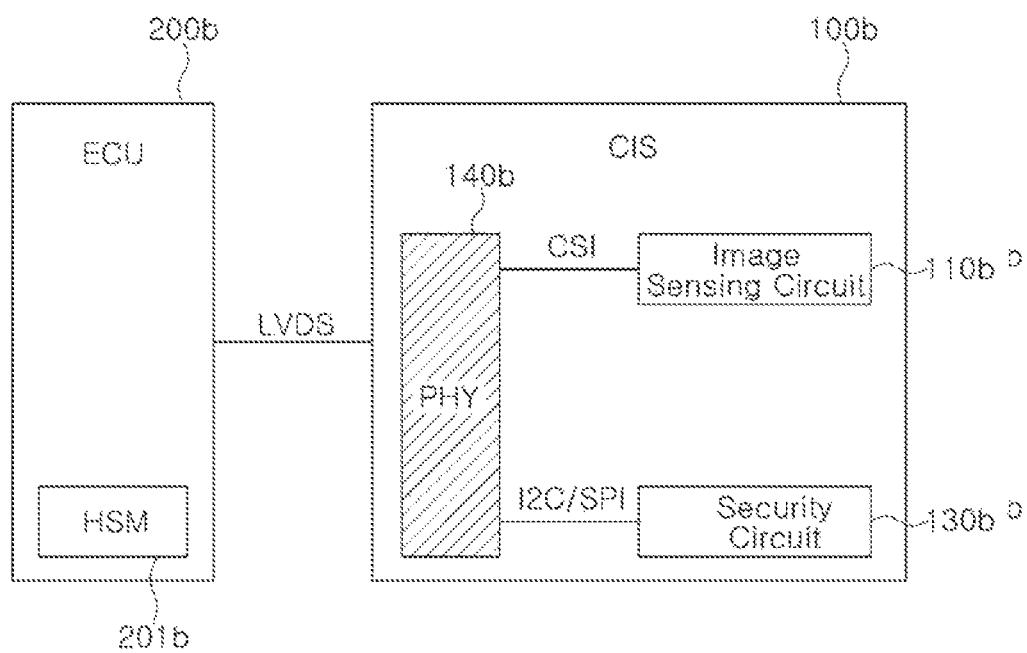

FIG. 12B is a view illustrating a channel between an image sensor 100*b* and a controller 200*b* according to another embodiment. Referring to FIG. 12B, an image sensor 100*b* and a controller 200*b* may communicate through a low voltage differential signal (LVDS) channel. A physical layer module PHY of the image sensor 100*b* may receive image data from an image sensing circuit 110*b* in a CSI scheme, or may receive security-related data from a security circuit 130*b* in a side channel manner, and the received data may be converted into serial data suitable for an LVDS scheme. In addition, the physical layer module PHY may receive data from the controller 200b in the LVDS scheme, and may convert the received data in a CSI scheme or a side channel scheme. The controller 200b may include a security module 201b (HSM) that performs an authentication operation with the image sensor 100b in an LVDS scheme or performs an encryption/decryption operation.

Figure 13:
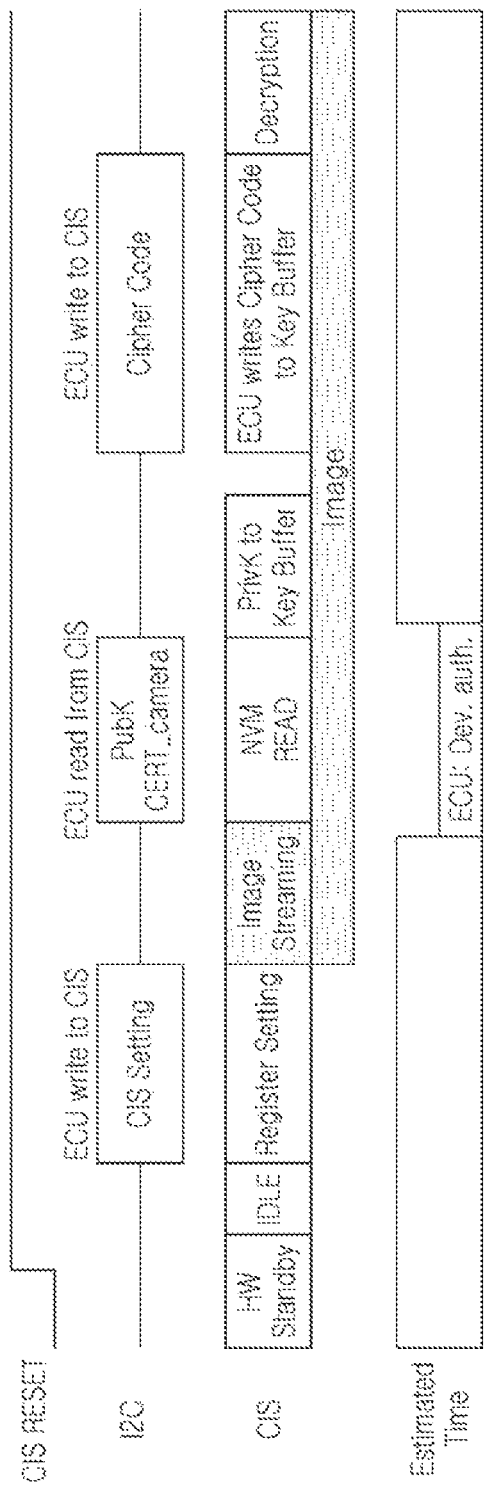
FIG. 13 is a timing diagram illustrating a booting operation of an image sensor according to some embodiments.

FIG. 13 is a timing diagram illustrating a booting operation of an image sensor CIS according to some embodiments. Hereinafter, for convenience of explanation, a controller will be referred to as an ECU.

Referring to FIG. 13, a booting operation may be performed when a CIS reset signal is on a high level. Through an I2C channel, an ECU may write information related to initialization operation for transmitting image to the ECU to a CIS. In this case, a security circuit in the CIS may be in an uninitialized state, and may be in standby mode. By setting image transmission, a CIS setting operation may be performed. Thereafter, as the image is transmitted to the ECU, the ECU may read a public key from the CIS for device authentication through an I2C channel, data required for device authentication (PubK, CERT_camera), and the like. Then, the ECU may write an RSA encryption code (e.g., the cipher text CT of FIG. 1) to the CIS through the I2C channel.

The CIS may be in a hardware standby state or in an idle state (IDLE), before performing the CIS setting operation. In a section of the CIS setting operation, the CIS may perform register setting for performing an image sensing operation. CIS information according to such register setting may be transmitted to the ECU. When the register setting is completed, the CIS may sense an image. The CIS may directly output an acquired first image stream to the ECU. As illustrated in FIG. 10A, as the first image stream transmits, a device authentication operation may be performed. The CIS may perform a read operation for an NVM to obtain a private key PrivK. Thereafter, the CIS may transmit the private key PrivK to a key buffer of a security circuit. After that, the ECU may restore the private key PrivK processed in a DPA countermeasure module, and may send the restored private key to the key buffer of the secure circuit, and a message may be decrypted using the restored private key. Thereafter, the ECU may transmit a cipher text to the CIS. In this case, the cipher text may include a key value encrypted with a public key (PubK, CERT_camera) of the CIS. The CIS may decrypt an encryption code using the private key PrivK. Therefore, the CIS may share the key value with the ECU through an authentication operation. For performing this message decryption, the CIS may receive an encrypted cipher text encrypted with a security algorithm (e.g. RSA, ECC, . . . ) or the like from the ECU, through a command channel such as I2C, SPI, or the like. After receiving the cipher text, the CIS may restore an original message through decryption process. This restored data may include key data for CMAC, addition information for CMAC processing, or the like.

Thereafter, a tag (or a MAC value) for an image is acquired by using a CMAC key value included in a decrypted value. As illustrated in FIG. 13, after the register setting of the CIS, as the image streaming is performed in the CIS, a device authentication operation (ECU: Dev. Auth) of the ECU may be performed at the same time. Therefore, a CIS booting time may be shortened.

Figure 14:
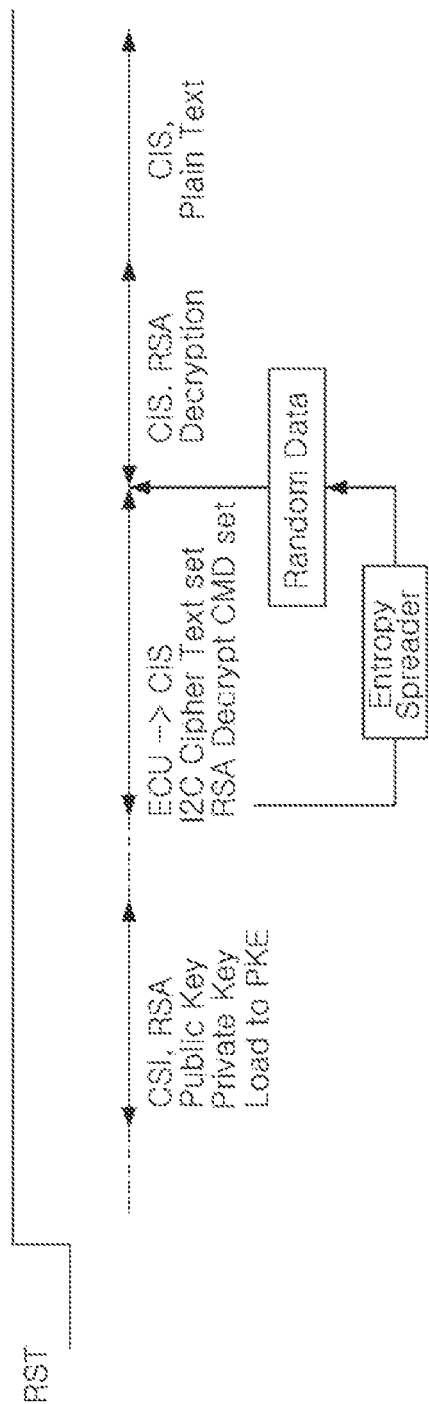
FIG. 14 is a view illustrating a process for receiving data from an image sensor according to some embodiments.

FIG. 14 is a view illustrating a process for receiving data from an image sensor CIS according to some embodiments. Referring to FIG. 14, a crypto module of an image sensor CIS (100 in FIG. 1) may load a public key and a private key according to an RSA encryption algorithm for key exchange (PKE), when a reset signal is on a high level. The crypto module of the image sensor CIS may transmit its public key to a controller ECU (200 in FIG. 1), and the controller ECU may transmit a cipher text through an I2C channel. In this case, the cipher text may be encrypted using the public key of the image sensor CIS. The crypto module of the image sensor CIS may decrypt a command set. In this case, the image sensor CIS may generate a random number (or random data) using the cipher text. In this case, the random number may be generated using some data of the cipher text by an entropy spreader for the cipher text. The crypto module of the image sensor CIS may decrypt the cipher text using the private key. In this case, it will be used for a random number operation for preventing a DPA attack on the private key during the decryption process. The image sensor CIS may use a decoded plain text.

Figure 15:
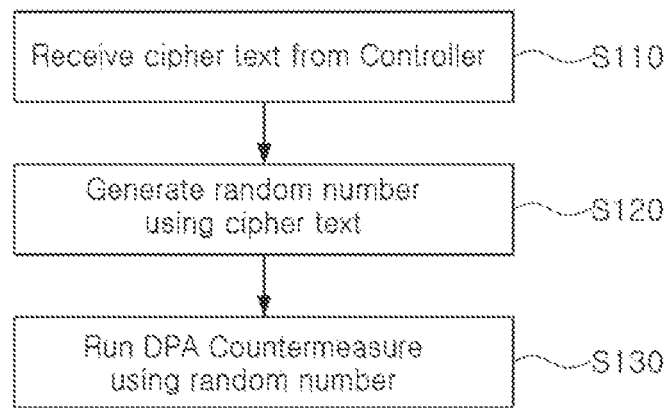
FIG. 15 is a flowchart illustrating an operating method of an image sensor according to some embodiments.

FIG. 15 is a flowchart illustrating an operating method of an image sensor according to some embodiments. Referring to FIG. 15, an image sensor may operate as follows. The image sensor 100 may receive a cipher text from a controller 200 (S110). In some embodiments, the image sensor 100 may receive the cipher text from an ECU. The image sensor 100 may generate a random number using the cipher text (S120). The image sensor 100 may execute DPA countermeasures using the random number (S130).

Figure 16:
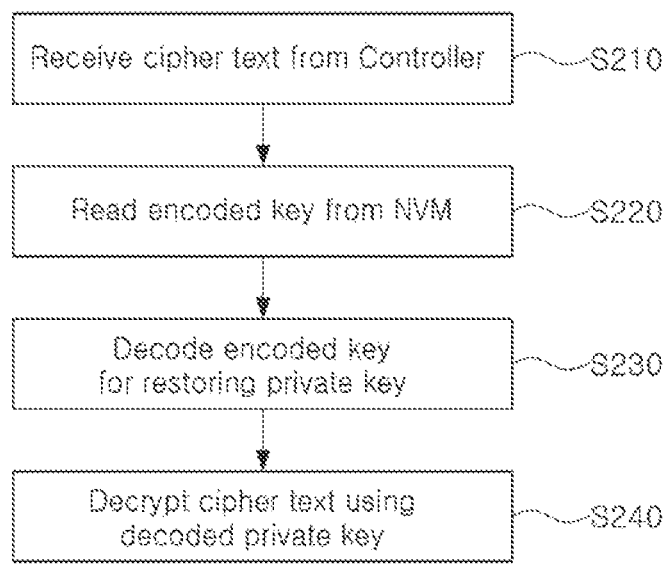
FIG. 16 is a flowchart illustrating an operating method of an image sensor according to some embodiments.

FIG. 16 is a flowchart illustrating an operating method of an image sensor according to some embodiments. Referring to FIG. 16, an image sensor may operate as follows. The image sensor 100 may receive a cipher text from a controller 200 (S210). In some embodiments, the image sensor 100 may receive the cipher text from an ECU. A security circuit 130 of the image sensor 100 may read an encoded private key from an NVM, to decrypt the cipher text (S220). The security circuit 130 may decode the encoded private key (S230). For example, the security circuit 130 may decode a read private key, to restore a private key using random numbers. Then, the security circuit 130 may decrypt the cipher text using the decoded private key (S240).

In an embodiment, random numbers may be block cipher-based pseudo-random numbers. In an embodiment, a block cipher-based pseudo-random number generator may generate random numbers using partial information of a private key. In an embodiment, a private key may be divided into data of a predetermined unit, an index corresponding to first data, among the divided data, may be set, and a first random number among the random numbers may be generated by repeatedly driving a block cipher-based pseudo-random number generator as much as the index using the first data as a seed value. In an embodiment, an XOR operation on remaining data, except for first data, among the divided data, respectively, and an XOR operation on random numbers may be sequentially performed. In an embodiment, an NVM may store first data among data acquired by dividing a private key into data of a predetermined unit, and data, other than the first data, encoded by random numbers. In an embodiment, an XOR operation on encoded data, respectively, and an XOR operation on random numbers may be sequentially performed.

Figure 17:
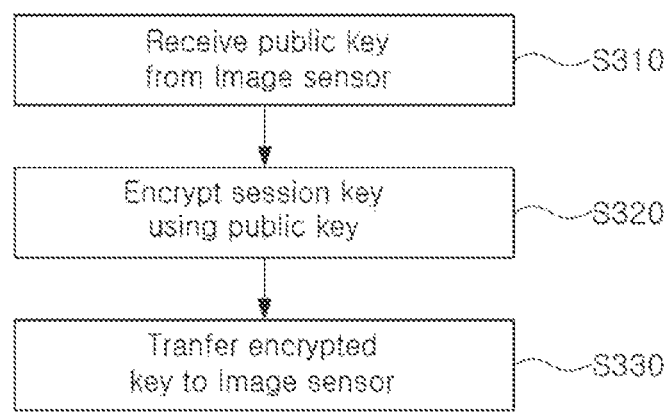
FIG. 17 is a flowchart illustrating an operating method of a controller according to some embodiments.

FIG. 17 is a flowchart illustrating an operating method of a controller according to some embodiments. Referring to FIG. 17, a controller may operate as follows. The controller 200 may receive a public key from an image sensor 100 (S310). In some embodiments, the image sensor 100 may be a CMOS image sensor (CIS). The controller 200 may encrypt a session key using the public key (S320). The controller 200 may transmit the encrypted session key to the image sensor 100 (S330).

Figure 18:
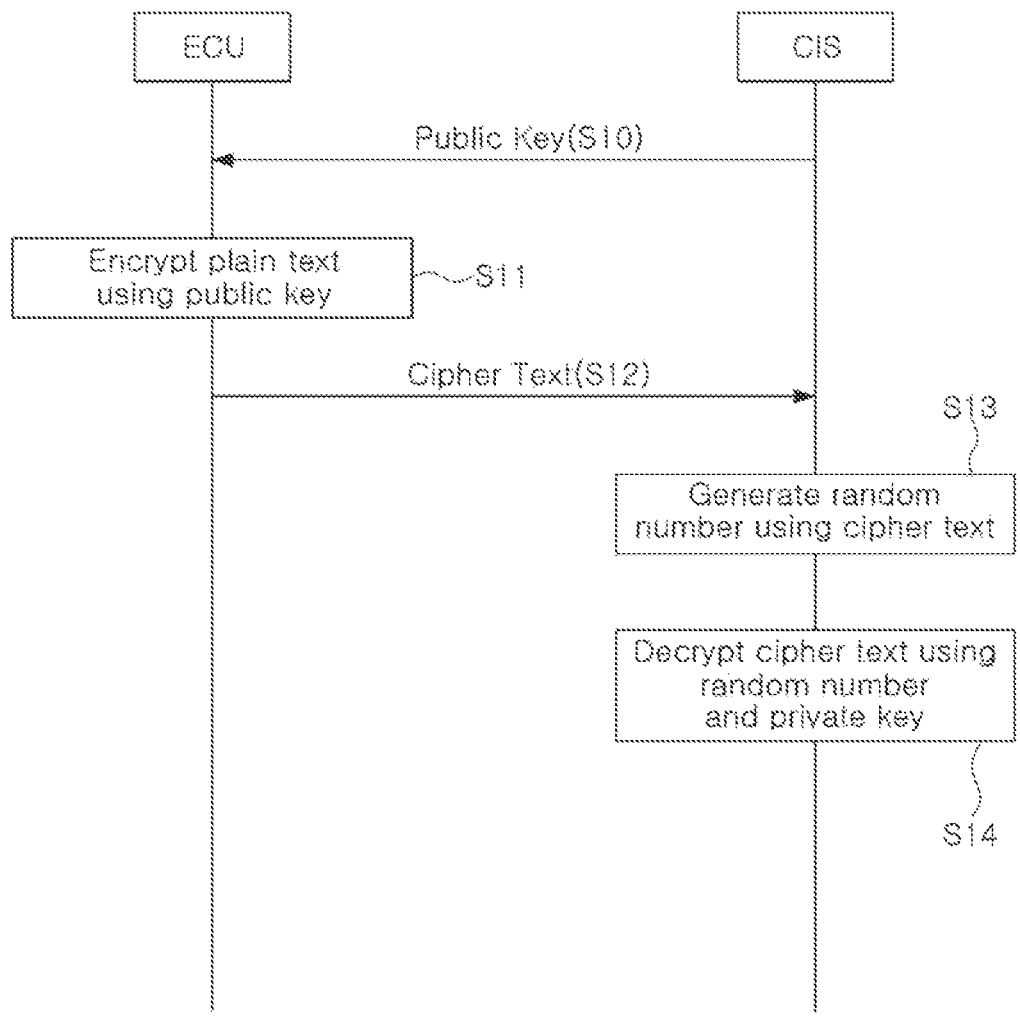
FIG. 18 is a ladder diagram illustrating an operation of an image processing system according to some embodiments.

FIG. 18 is a ladder diagram illustrating an operation of an image processing system according to some embodiments. Referring to FIGS. 1 to 18, an operation of an image processing system 10 may proceed as follows.

An image sensor CIS may transmit a public key to an ECU (S10). The ECU may encrypt a plain text using the received public key (511). The ECU may transmit a cipher text to the image sensor CIS (S12). The image sensor CIS may generate a random number using the cipher text (S13). The image sensor CIS may decrypt the cipher text using the random number and a private key (S14).

Figure 19:
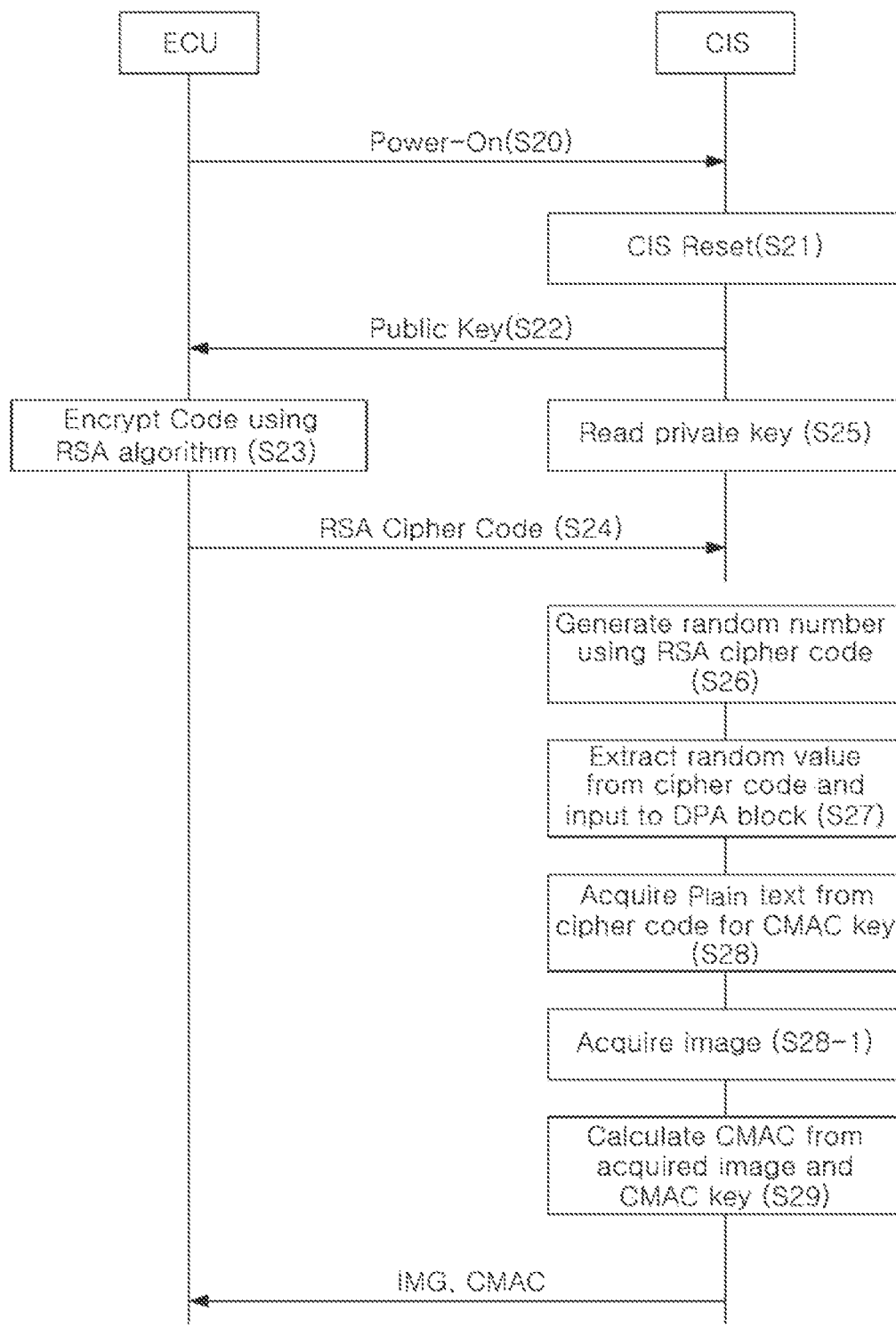
FIG. 19 is a ladder diagram illustrating a process for transmitting image data of an image processing system according to some embodiments.

FIG. 19 is a ladder diagram illustrating a process for transmitting image data of an image processing system 10 according to some embodiments. Referring to FIGS. 1 to 19, an image processing system 10 may transmit image data as follows.

An image sensor CIS may receive a power-on command from an ECU (S20). The image sensor CIS may perform a reset operation in response to the power-on command (S21). Thereafter, the image sensor CIS may transmit a public key thereof to the ECU (S22). The ECU may encrypt a code using the received public key of the image sensor CIS and an RSA algorithm (S23). It should be understood that the present inventive concept is not limited to the RSA algorithm. The present inventive concept may use an asymmetric-key encryption algorithm. The ECU may transmit an RAS encryption code (or, the cipher text CT of FIG. 1) to the image sensor CIS (S24).

The image sensor CIS may generate a random number using the RSA encryption code (S26). The image sensor CIS may extract the random number from the RAS encryption code, and input the random number into a DPA block (S27). In this case, a decrypted code may be key information used to verify integrity of an image.

The image sensor CIS may acquire a plain text from an encryption code for a tag (S28). The image sensor CIS may acquire an image IDATA from an image sensing circuit 110 (S28-1). The image sensor CIS may calculate a CMAC tag and a tag key using the decrypted code, e.g., key information and the acquired image IDATA (S29). The image sensor CIS may transmit the acquired image data IDATA and the CMAC tag to the controller ECU.

A DPA countermeasure module may be activated.

Figure 20:
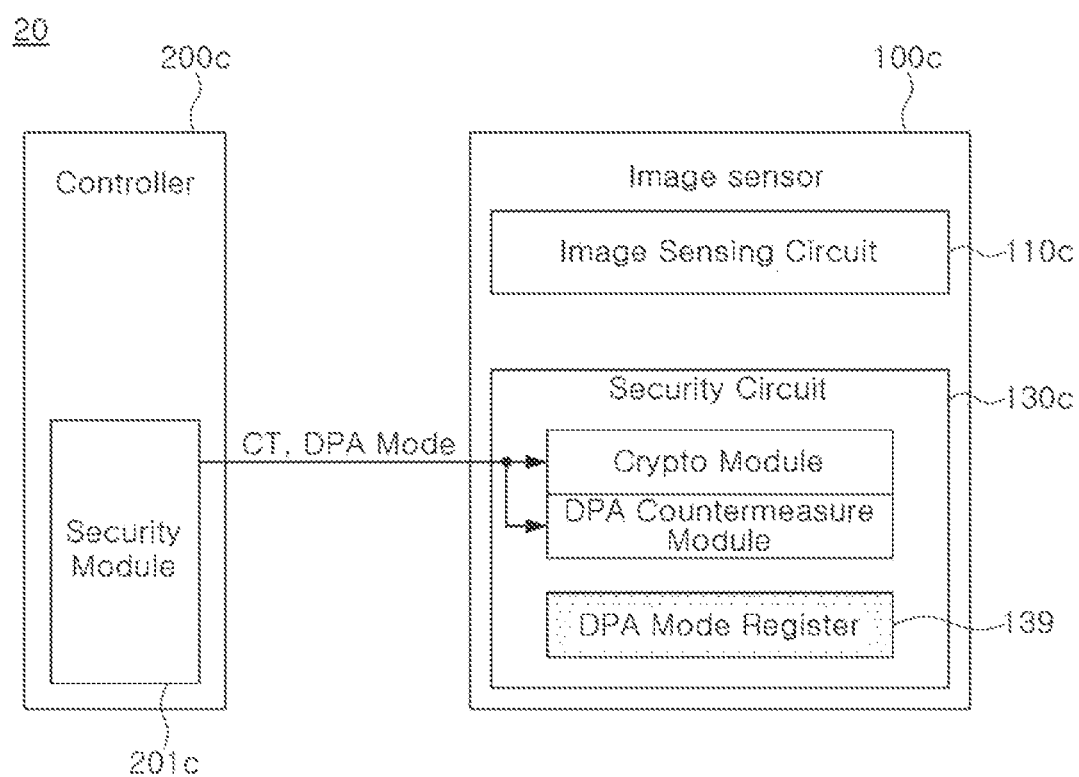
FIG. 20 is a view illustrating an image processing system according to another embodiment.

FIG. 20 is a view illustrating an image processing system 20 according to another embodiment. Referring to FIG. 20, an image processing system 20 may include an image sensor 100c and a controller 200c. The image sensor 100c further may include a DPA mode register 139, as compared to the image sensor 100 of FIG. 1. The DPA mode register 139 may be implemented to store a DPA mode. The DPA mode may be generated, when activation of the DPA countermeasure module 139 in a security module 201c of the controller 200c is to be used.

Figure 21A:
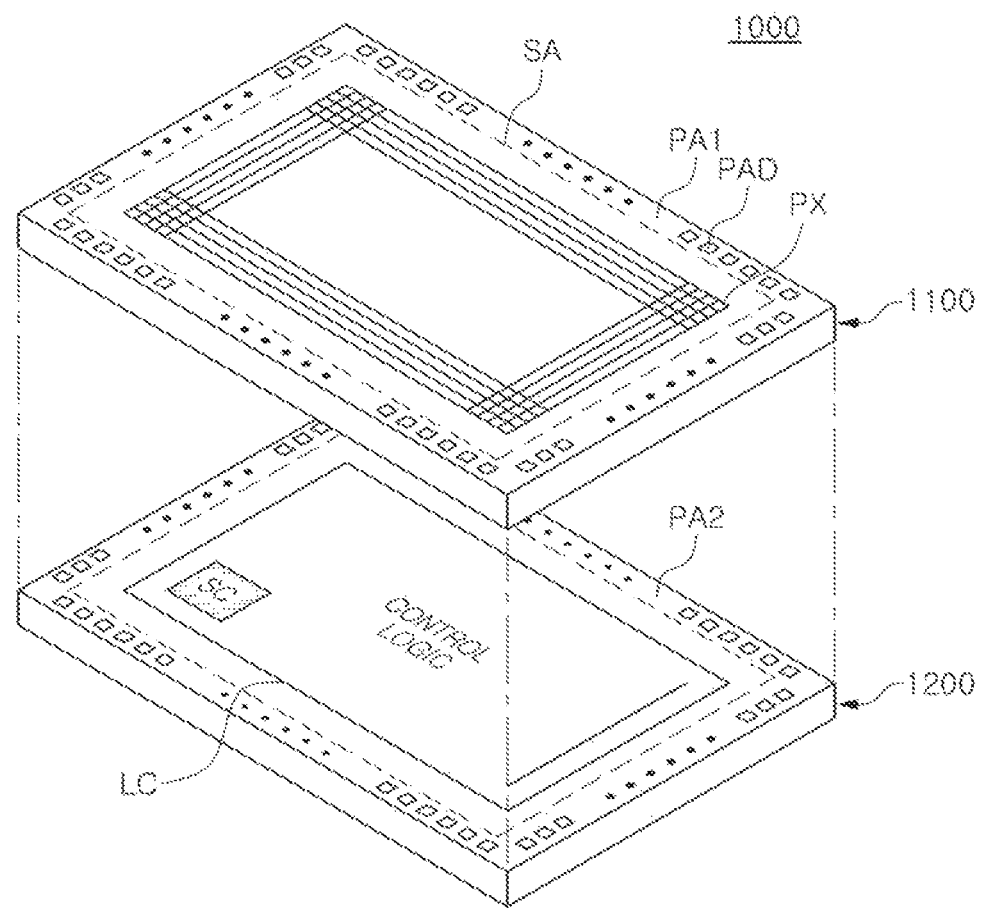
FIGS. 21A, 21B, and 21C are views illustrating an image sensor according to some embodiments.
Figure 21B:
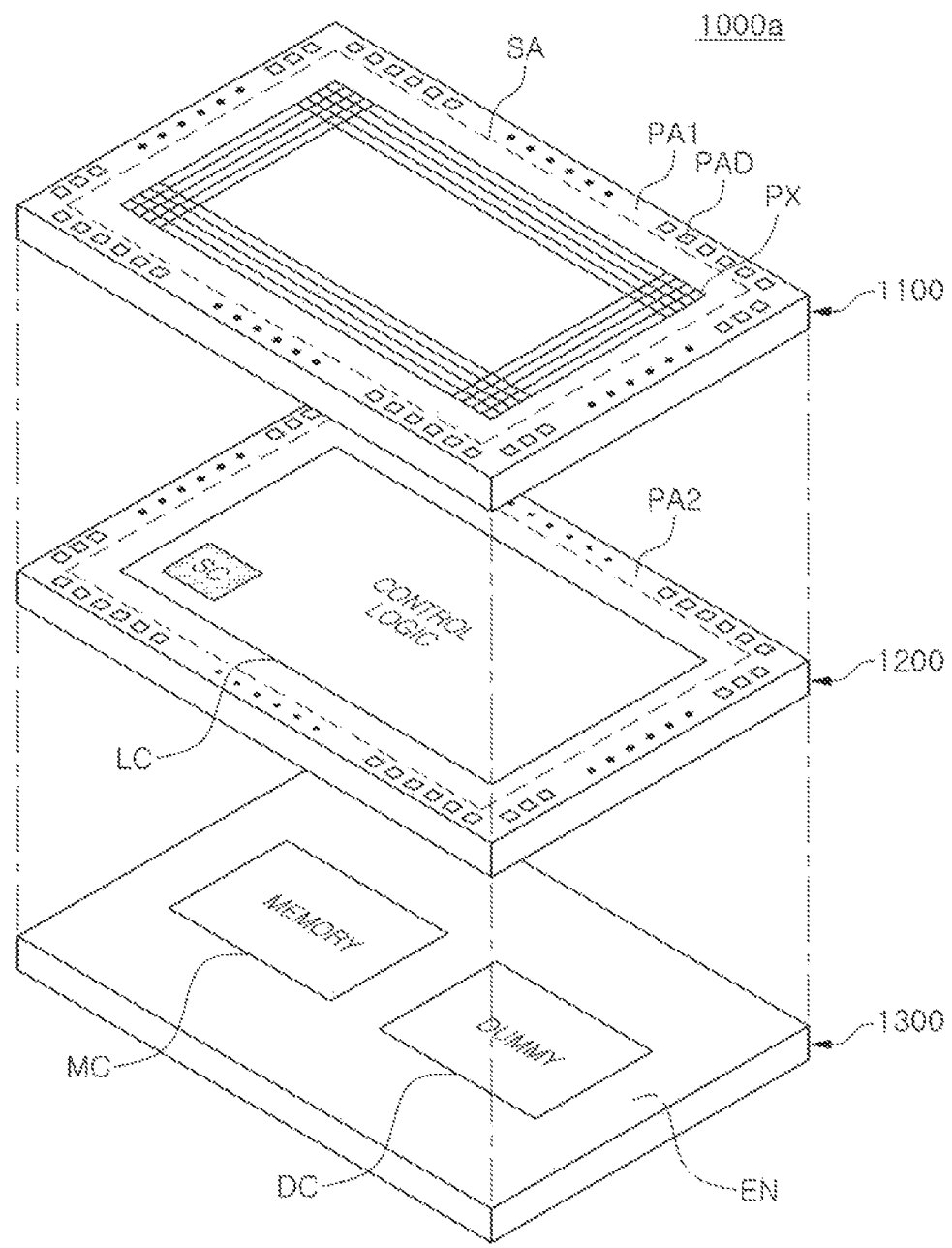
Figure 21C:
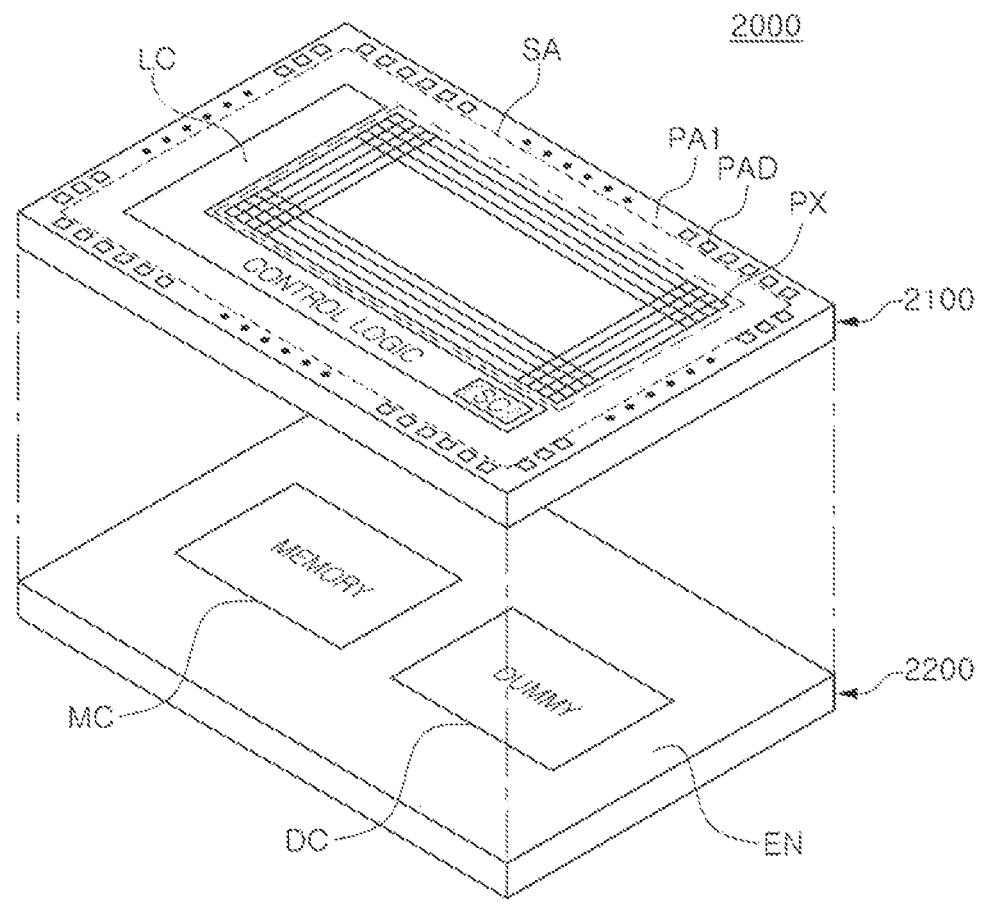

FIGS. 21A, 21B, and 21C are views illustrating an image sensor according to some embodiments.

Referring to FIG. 21A, an image sensor 1000 according to some embodiments may include a first layer 1100 and a second layer 1200 provided below the first layer 1100. In an embodiment, the first layer 1100 and the second layer 1200 may be stacked in a direction, perpendicular to each other. In an embodiment, the first layer 1100 and the second layer 1200 may be stacked on each other on a wafer level.

The first layer 1100 may include a sensing region SA provided with a plurality of pixels PX, and a first pad region PA1 provided around the sensing region SA. The first pad region PA1 may include a plurality of upper pads PAD, and the plurality of upper pads PAD may be connected to pads provided in a second pad region PA2 and a control logic LC in the second layer 1200 through a via or the like. Each of the plurality of pixels PX may include a photodiode that receives light to generate an electric charge, a pixel circuit that processes the electric charge generated by the photodiode, or the like. The pixel circuit may include a plurality of transistors for outputting a voltage corresponding to the electric charge generated by the photodiode.

The second layer 1200 may include a plurality of elements that provide the control logic LC. The plurality of elements included in the control logic LC may provide circuits for driving the pixel circuit provided in the first layer 1100, for example, a row driver, a column driver, a timing controller, and the like. The plurality of elements included in the control logic LC may be connected to the pixel circuit through the first and second pad regions PA1 and PA2. The control logic LC may generate a pixel signal by obtaining a reset voltage and a pixel voltage, from the plurality of pixels PX. The control logic LC may include a security circuit CS that performs the security function described with reference to FIGS. 1 to 18.

In an embodiment, at least one of the plurality of pixels PX may include a plurality of photodiodes disposed on the same level. Pixel signals generated from electric charges of each of the photodiodes may have a phase difference from each other, and the control logic LC may include a plurality of photodiodes included in one pixel PX. An autofocus function may be provided based on the phase difference between the pixel signals generated from the photodiodes.

Referring to FIG. 21B, an image sensor 1000a may further include a third layer 1300 provided below a second layer 1200, compared to the image sensor 1000 illustrated in FIG. 21A. In an embodiment, a first layer 1100, a second layer 1200, and a third layer 1300 may be stacked in a direction, perpendicular to each other. In an embodiment, the first layer 1100 and the second layer 1200 may be stacked on each other on a wafer level, and the third layer 1300 may be attached to a lower portion of the second layer 1200 on a chip level. In an embodiment, the first to third layers 1100 to 1300 may be provided as one semiconductor package.

The third layer 1300 provided below the second layer 1200 may include a memory chip MC, a dummy chip DC, and a protective layer EN sealing the memory chip MC and the dummy chip DC. The memory chip MC may be a dynamic random access memory (DRAM) or a static random access memory (SRAM), and the dummy chip DC may not have a function of actually storing data. The memory chip MC may be electrically connected to at least some of an element included in a control logic LC of the second layer 1200 by a bump, and may store information necessary to provide an autofocus function. In an embodiment, the bump may be a micro bump.

Referring to FIG. 21C, an image sensor 2000 may include a first layer 2100 and a second layer 2200. The first layer 2100 may include a sensing region SA in which a plurality of pixels PX are provided, a control logic LC in which elements for driving the plurality of pixels PX are provided, and a first pad region PA1 provided around the sensing region SA and the control logic LC. The control logic LC may include a security circuit SC having a DPA countermeasure module that prevents a DPA attack on the private key, as described in FIGS. 1 to 18.

The first pad region PA1 may include a plurality of upper pads PAD. In an embodiment, the plurality of upper pads PAD may be connected to a memory chip MC provided in the second layer 2200 through a via or the like. The second layer 2200 may include a memory chip MC and a dummy chip DC, and a protective layer EN sealing the memory chip MC and the dummy chip DC.

Figure 22:
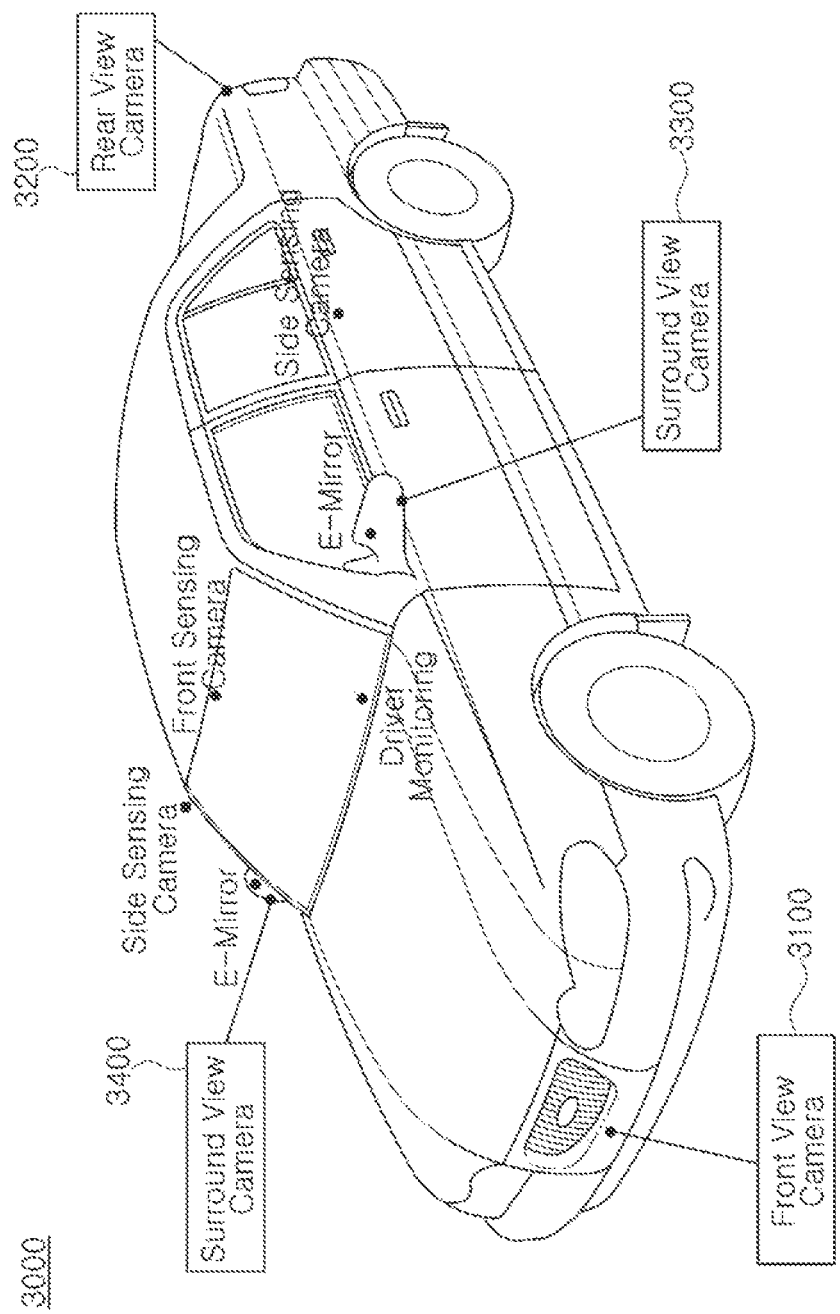
FIG. 22 is a view illustrating an autonomous driving vehicle according to some embodiments.

FIG. 22 is a view illustrating an autonomous driving vehicle 3000 according to some embodiments. Referring to FIG. 22, a front view camera 3100, a rear view camera 3200, and surround view cameras 3300 and 3400 may be implemented as the image sensors described in FIGS. 1 to 21B. In addition, at least one of a side sensing camera, a driver monitoring camera, and an electronic mirror may be implemented as the image sensor described in FIGS. 1 to 21C.

Various embodiments described herein may be used for autonomous driving.

Figure 23:
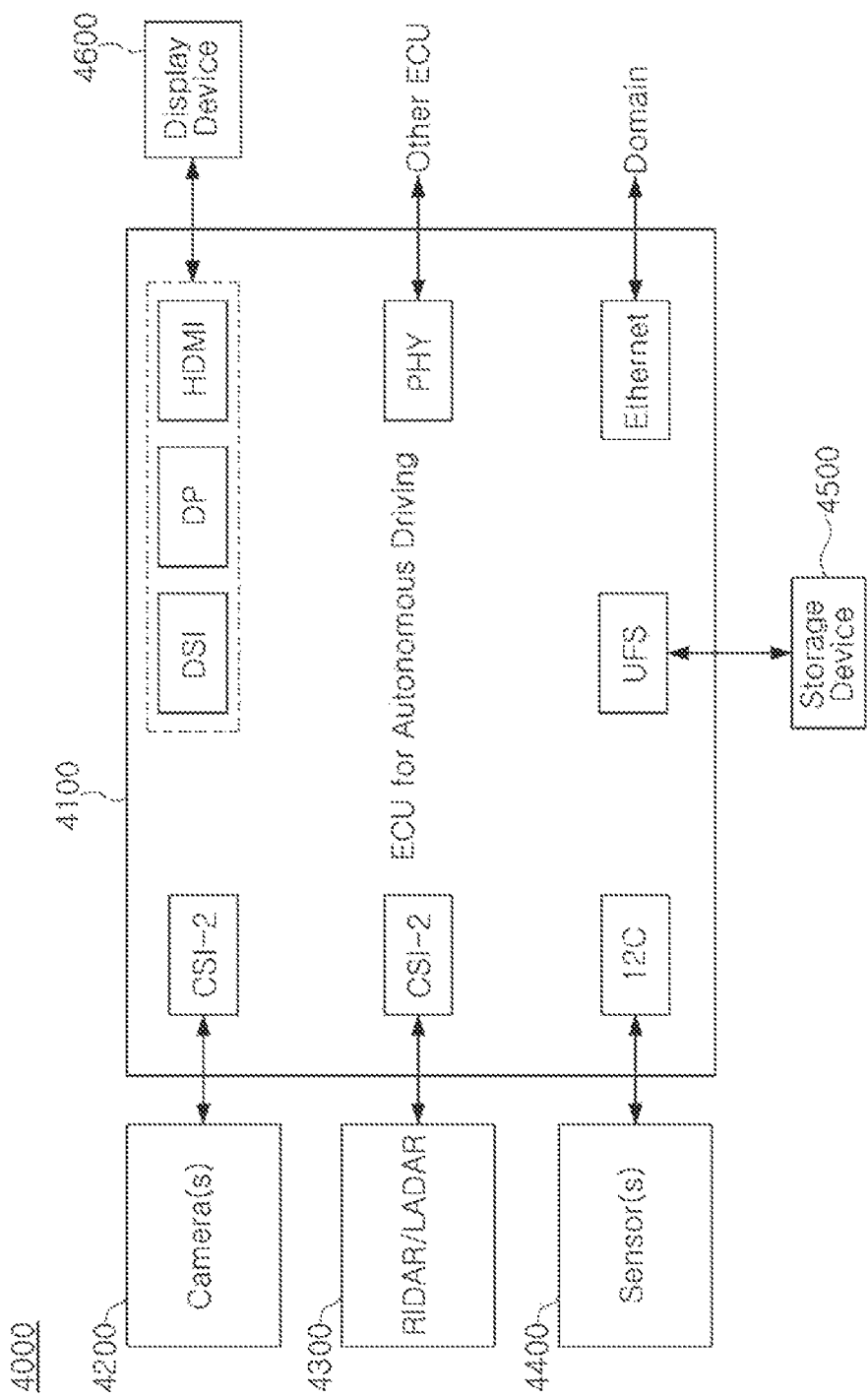
FIG. 23 is a view illustrating an autonomous driving system according to some embodiments.

FIG. 23 is a view illustrating an autonomous driving system 4000 according to some embodiments. Referring to FIG. 23, an autonomous driving system 4000 may include an ECU 4100, at least one camera 4200, RIDAR/LADAR 4300, at least one sensor 4400, a storage device 4500, and a display device 4600.

The ECU 4100 may be connected to the at least one camera 4200 and the RIDAR/LADAR 4300 through a CSI-2 interface. In this case, the camera 4200 and the RIDAR/LADAR 4300 may be implemented to perform secure communication with the ECU 4100 and incapacitate a DPA attack on a private key, as described in FIGS. 1 to 21C.

The ECU 4100 may be connected to the at least one sensor 4400 through an I2C interface. The ECU 4100 may be connected to the storage device 4500 through a universal flash storage (UFS) interface. The ECU 4100 may be connected to the display device 4600 through a display interface, such as a high definition multimedia interface (HDMI), a display serial interface (DSI), an embedded display port (eDP), or the like. The ECU 4100 may be connected to another ECU through a mobile industry processor interface (MIPI) A-PHY interface. It should be understood that the present inventive concept is not limited to the MIPI A-PHY interface. The ECU 4100 may be connected to another ECU through a MIPI C-PHY/D-PHY/M-PHY interface. The ECU 4100 may be connected to another domain in a vehicle through an Ethernet interface. It should be understood that the present inventive concept is not limited to the Ethernet interface. The ECU 4100 may be connected to other domains through various interfaces for vehicle communication (CAN, CAN-FD, LIN, FlexRay, etc.).

In general, an image sensor may perform a reset operation, may receive a cipher text encrypted from a host, and may perform a decryption operation. Random data may be required for a function of a countermeasure against an external DPA attack during such a decryption operation. An image sensor according to some embodiments may efficiently acquire such random data.

To obtain random data, a related art system may use a specific IP such as a true random number generator (TRNG) or the like. By contrast, the image sensor of various embodiments may acquire random data, used as DPA countermeasures, from encrypted data received from the host. Since a vehicle image sensor of various embodiments does not use a true random number generator (TRNG) IP, a reduction in system area may be expected by that much. In addition, it is possible to reduce possibility of leakage of a random number generator. An image sensor of various embodiments may efficiently acquire random data without using a true random number generator. It should be understood that embodiments are not limited to the image sensor. The various embodiments may be applicable to any type of electronic device that connects to a host and uses a random number to perform secure communication. For example, an electronic device according to some embodiments may be implemented to generate a random number using randomness of a cipher text of the host.

In addition, a related art system has a structure vulnerable to a DPA attack by storing the private key in the form of raw data into an NVM in a CIS. An image processing system according to some embodiments may be implemented to make an image sensor strong against the DPA attack, to prevent possibility of leaking the private key externally. An image sensor according to some embodiments may incapacitate the DPA attack on the private key. Therefore, various embodiments may improve reliability of a cyber security system of an autonomous vehicle.

The contents of the present disclosure described above may be only specific examples for carrying out the various embodiments. The embodiments include not only concrete and practically usable means, but also technical ideas, which may be abstract and conceptual ideas that may be utilized as future technologies.

An image sensor, an image processing system having the same, and an operating method of the same, according to some embodiments, may incapacitate or prevent a DPA attack against a private key.

While example embodiments have been illustrated and described above, it will be apparent to those skilled in the art that modifications and variations could be made without departing from the scope of the present disclosure as defined by the appended claims.

What is claimed is:

1. An image sensor comprising:
    an image sensing circuit configured to acquire image data; and
    a security circuit configured to generate a tag for integrity of the image data,
    wherein the security circuit includes:
        a crypto circuitry configured to receive a cipher text that is encrypted with a public key from a controller, and decrypt the cipher text based on an encryption algorithm using a private key; and
        a differential power analysis (DPA) countermeasure circuitry configured to perform DPA defense against an operation of the crypto circuitry using a random value corresponding to all or a portion of the cipher text.

2. The image sensor of claim 1, wherein the security circuit performs an authentication operation with the controller.

3. The image sensor of claim 1, wherein the security circuit further comprises:
    random number generator circuitry configured to generate a random number using the random value; and
    an entropy spreader circuitry configured to output an index corresponding to the random value to increase randomness of the cipher text.

4. The image sensor of claim 3, wherein the cipher text is divided into a plurality of divided data,
    wherein the random number generator circuitry determines one of the plurality of divided data as the random number according to the index.

5. The image sensor of claim 4, wherein the random number generator circuitry comprises a multiplexer configured to select one of the plurality of divided data according to the index.

6. The image sensor of claim 5, wherein the index is a value corresponding to temperature information of the image sensing circuit.

7. The image sensor of claim 5, wherein the entropy spreader circuitry comprises:
a temperature sensor configured to sense a temperature of the image sensing circuit and output temperature information based on the temperature; and
index encoder circuitry configured to output the index using the temperature information.

8. The image sensor of claim 5, wherein the entropy spreader circuitry is implemented with a block cipher-based pseudo-random number generator (BPRNG).

9. The image sensor of claim 5, wherein the entropy spreader circuitry generates the index using the cipher text and the encryption algorithm.

10. The image sensor of claim 1, wherein the encryption algorithm is an asymmetric-key encryption algorithm.

11. An operating method of an image sensor, the operating method comprising:
receiving a cipher text from a controller;
generating a random number using the cipher text; and
executing a differential power analysis (DPA) countermeasure module using the random number,
wherein the generating the random number comprises:
dividing the cipher text into a plurality of divided data; and
selecting one of the plurality of divided data as the random number according to an index.

12. The operating method of claim 11, wherein the cipher text is encrypted with a public key of the image sensor.

13. The operating method of claim 12, further comprising transmitting the public key to the controller.

14. The operating method of claim 11, wherein the generating the random number further comprises generating the index using a pseudo-random number generator.

15. An image processing system comprising:
an image sensor configured to acquire image data; and
a controller configured to receive the image data from the image sensor,
wherein the image sensor includes:
an image sensing circuit configured to sense the image data; and
a security circuit configured to perform an authentication operation with the controller, to receive a cipher text from the controller, and to decrypt the received cipher text using a secret key,
wherein the security circuit generates a random number using all or a portion of the cipher text, and prevents a differential power analysis (DPA) attack on the secret key in a decryption operation of the cipher text using the random number.

16. The image processing system of claim 15, wherein the security circuit generates a tag corresponding to the image data, and
the image sensor transmits the image data and the tag to the controller through a first communication channel and receives the cipher text through a second communication channel.

17. The image processing system of claim 16, wherein the first communication channel communicates in a camera serial interface (CSI) mode, and
the second communication channel communicates in an inter-integrated circuit (I2C) mode.

18. The image processing system of claim 15, wherein the security circuit comprises random number generator circuitry configured to receive the cipher text and to generate the random number using the cipher text.

19. The image processing system of claim 18, wherein the security circuit further comprises an entropy spreader circuitry configured to output a random value for increasing randomness of the cipher text using internal information of the image sensor.

* * * * *